US008850545B2

(12) United States Patent
Cha et al.

(10) Patent No.: US 8,850,545 B2
(45) Date of Patent: Sep. 30, 2014

(54) SYSTEMS AND METHODS FOR SECURING NETWORK COMMUNICATIONS

(75) Inventors: Inhyok Cha, Gangnam-KU (KR); Louis J. Guccione, East Chester, NY (US); Andreas Schmidt, Frankfurt (DE); Andreas Leicher, Frankfurt (DE); Yogendra C. Shah, Exton, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 13/428,836

(22) Filed: Mar. 23, 2012

(65) Prior Publication Data

US 2013/0080769 A1   Mar. 28, 2013

Related U.S. Application Data

(60) Provisional application No. 61/466,662, filed on Mar. 23, 2011, provisional application No. 61/525,575, filed on Aug. 19, 2011, provisional application No. 61/466,852, filed on Mar. 23, 2011.

(51) Int. Cl.
| | |
|---|---|
| *H04L 29/06* | (2006.01) |
| *H04W 12/06* | (2009.01) |
| *H04L 29/08* | (2006.01) |
| *H04L 9/32* | (2006.01) |
| *G06F 21/33* | (2013.01) |
| *G06F 21/42* | (2013.01) |

(52) U.S. Cl.
CPC .............. *H04L 9/321* (2013.01); *H04W 12/06* (2013.01); *G06F 21/335* (2013.01); *H04L 67/02* (2013.01); *H04L 63/168* (2013.01); H04L 63/0869 (2013.01); H04L 63/0272 (2013.01); *H04L 63/08* (2013.01); G06F 21/42 (2013.01)
USPC .............................................. 726/8; 713/155

(58) Field of Classification Search
CPC ......... H04W 88/08; H04I 63/10; G06F 21/42; G06F 21/335
USPC ........................................................ 713/155
See application file for complete search history.

(56) References Cited

U.S. PATENT DOCUMENTS

| | | |
|---|---|---|
| 6,988,250 B1 | 1/2006 | Proudler et al. |
| 7,441,118 B2 | 10/2008 | Lawman et al. |

(Continued)

FOREIGN PATENT DOCUMENTS

WO    WO 03/077572    9/2003

OTHER PUBLICATIONS

U.S. Appl. No. 13/589,991, filed Aug. 20, 2012, Leicher.

(Continued)

*Primary Examiner* — Hadi Armouche
*Assistant Examiner* — Bryan Wright
(74) *Attorney, Agent, or Firm* — Baker & Hostetler LLP

(57) ABSTRACT

Secure communications may be established amongst network entities for performing authentication and/or verification of the network entities. For example, a user equipment (UE) may establish a secure channel with an identity provider, capable of issuing user identities for authentication of the user/UE. The UE may also establish a secure channel with a service provider, capable of providing services to the UE via a network. The identity provider may even establish a secure channel with the service provider for performing secure communications. The establishment of each of these secure channels may enable each network entity to authenticate to the other network entities. The secure channels may also enable the UE to verify that the service provider with which it has established the secure channel is an intended service provider for accessing services.

27 Claims, 17 Drawing Sheets

(56) References Cited

U.S. PATENT DOCUMENTS

| | | | |
|---|---|---|---|
| 2006/0020791 A1* | 1/2006 | Laitinen | 713/168 |
| 2009/0216644 A1* | 8/2009 | Summer et al. | 705/14 |
| 2010/0136943 A1* | 6/2010 | Hirvela et al. | 455/404.1 |
| 2012/0036360 A1* | 2/2012 | Bassu et al. | 713/168 |
| 2012/0102315 A1* | 4/2012 | Holtmanns et al. | 713/150 |
| 2012/0204231 A1* | 8/2012 | Holtmanns et al. | 726/3 |
| 2013/0024919 A1* | 1/2013 | Wetter et al. | 726/6 |
| 2013/0097698 A1* | 4/2013 | Taveau et al. | 726/19 |
| 2013/0104202 A1* | 4/2013 | Yin et al. | 726/5 |
| 2013/0125222 A1 | 5/2013 | Pravetz et al. | |
| 2013/0238461 A1* | 9/2013 | Tieken et al. | 705/26.2 |

OTHER PUBLICATIONS

3GPP Standard; 3GPP TR 33.924, "3rd Generation Partnership Project; Technical Specification Group Services and System Aspects; Identity management and 3GPP security interworking; Identity management and Generic Authentication Architecture (GAA) interworking (Release 9)", No. V9.3.0, Oct. 6, 2010, pp. 1-39.

3GPP TR 33.914, "3rd Generation Partnership Project; Technical Specification Group Services and System Aspects; Single Sign on Application Security for Common IMS—based on SIP Digest (Release 11)," No. V2.0.0, Feb. 2012, pp. 1-48.

3GPP TR 33.924, "3rd Generation Partnership Project; Technical Specification Group Services and System Aspects; Identity management and 3GPP security interworking; Identity management and Generic Authentication Architecture (GAA) interworking (Release 9)," No. V9.4.0, Jun. 2011, pp. 1-40.

3GPP TS 33.220, "3rd Generation Partnership Project; Technical Specification Group Services and System Aspects; Generic Authentication Architecture (GAA); Generic bootstrapping architecture (GBA) (Release 9)," No. V9.4.0, Mar. 2012, pp. 1-75.

Blumenthal, U. and Goel, P., "Pre-Shared Key (PSK) Ciphersuites with NULL Encryption for Transport Layer Security (TLS)," RFC 4785, Network Working Group, © The IETF Trust, Jan. 2007, pp. 1-5.

Eronen, P., and Tschofenig, H., "Pre-Shared Key Ciphersuites for Transport Layer Security (TLS)," RFC 4279, Network Working Group, © The Internet Society, Dec. 2005, pp. 1-15.

Ferg et al., "OpenID Authentication 2.0—Final," http://openid.net/specs/openid-authentication-2_0.html, Dec. 5, 2007, pp. 1-36.

Franks et al., "An Extension to HTTP : Digest Access Authentication," RFC 2069, Network Working Group, Jan. 1997, pp. 1-17.

Franks et al., "HTTP Authentication: Basic and Digest Access Authentication," RFC 2617, Network Working Group, © The Internet Society, Jun. 1999, pp. 1-32.

International Patent Application No. PCT/US2012/030352: International Search Report and Written Opinion dated Aug. 8, 2012, 14 pages.

Rescorla, E., "Keying Material Exporters for Transport Layer Security (TLS)," RFC 5705, Internet Engineering Task Force, © The IETF Trust, Mar. 2010, pp. 1-7.

Williams, Sun N., "On the Use of Channel Bindings to Secure Channels; rfc5056.txt", Nov. 1, 2007, 23 pages.

* cited by examiner

SYSTEMS AND METHODS FOR SECURING NETWORK COMMUNICATIONS

CROSS REFERENCE TO RELATED APPLICATIONS

This application claims the benefit of U.S. Provisional Patent Application Ser. No. 61/466,662, filed Mar. 23, 2011, U.S. Provisional Patent Application Ser. No. 61/525,575, filed Aug. 19, 2011, and U.S. Provisional Patent Application Ser. No. 61/466,852, filed Mar. 23, 2011, the contents of which are hereby incorporated by reference in their entirety.

BACKGROUND

In communications networks, various forms of communication between network entities may be susceptible to third-party attacks. For example, according to one embodiment, a user device may attempt to access services (e.g., a website) from a service provider via a communications network. This access attempt, and/or other communications from the user device, may be intercepted by a third party or a man-in-the-middle (MitM). This third party may act as the intended service provider to gain access to information associated with the user device, such as authentication information (e.g., a username and/or password) for example. If the third party is successful in obtaining authentication information from the user device, the third party may use the authentication information for unintended or malicious purposes. For example, the third party may act as the user device to access services and/or other information from the intended service provider.

In one embodiment, the network communications may be vulnerable to attack, as the communications may not be sufficiently protected and/or may be sent without proper assurance that the network entity to which the communications are being sent is an authentic or intended network entity for receiving the communications. For example, network communications may be implemented using a one-sided authentication protocol, via the transmission of public keys for example, which may leave the network communications vulnerable to third party or MitM attacks.

SUMMARY

This Summary is provided to introduce various concepts in a simplified form that are further described below in the Detailed Description.

Systems, methods, and apparatus embodiments are described herein for establishing secure communications between a service provider and a user equipment (UE). For example, network communications may be implemented in a system comprising a UE, a service provider, and/or an identity provider. A secure channel may be established between the UE and the service provider. Authentication parameters may be sent to the identity provider for performing an authentication of the UE with the identity provider. A UE authentication assertion may be determined at the UE that indicates a successful authentication of the UE. For example, the UE authentication assertion may be received from an external network entity or determined locally at the UE. The UE may verify that the service provider with which the secure channel has been established is an intended service provider. The intended service provider may include the service provider from whom services are intended to be received and/or to whom authentication is to be performed for access to such services. The service provider may be verified as the intended service provider using at least one parameter generated during the authentication of the UE with the identity provider and/or during the establishment of the secure channel.

According to another example embodiment, a UE may be configured to establish secure communications with a service provider. The UE may include a memory having computer-executable instructions stored thereon, and a processor configured to execute the computer executable instructions. The UE may be configured to establish a secure channel between the UE and the service provider. The UE may send authentication parameters to an identity provider for performing an authentication of the UE with the identity provider. An authentication assertion may be determined at the UE that indicates a successful authentication of the UE. For example, the UE authentication assertion may be received from an external network entity or determined locally at the UE. The UE may also be configured to verify that the service provider with which the secure channel has been established is an intended service provider for performing authentication for services. The intended service provider may include the service provider from whom services are intended to be received and/or to whom authentication is to be performed for access to such services. The UE may verify that the service provider is the intended service provider using at least one parameter generated during the authentication of the UE with the identity provider and/or during the establishment of the secure channel.

According to another example embodiment, a secure channel may be established between the identity provider and the service provider. For example, key information may be received at the service provider via the secure channel between the identity provider and the service provider. A secure channel may also be established between the service provider and the UE, such as by using the received key information for example. At the service provider, an authentication assertion may be received indicating an authentication of the UE. The authentication assertion may be verified at the service provider using information received via the secure channel between the identity provider and the service provider and/or the secure channel between the service provider and the UE.

The Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to any limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION

Figure 1:
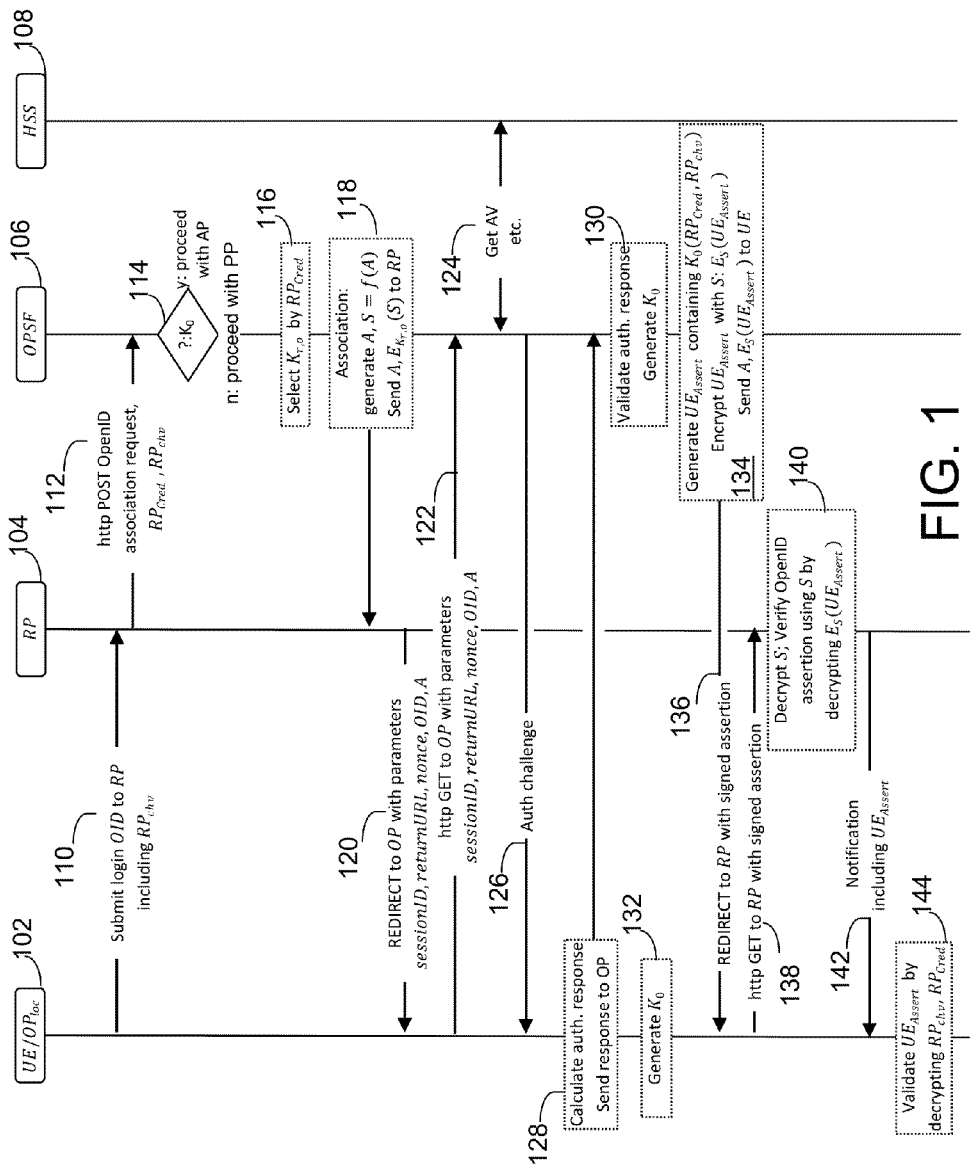
FIG. 1 is an example message flow diagram for a provisioning phase for establishing a secure channel between an identity provider and a user equipment (UE)

System, method, and apparatus embodiments disclosed herein provide for secure communications between network entities, such as a user/user equipment (UE), a service provider, and/or an identity provider for example. As described herein, secure communications may be performed via secure channels established between network entities using shared keys/secrets between the entities and/or using public/private keys. These secure channels may be used to prevent attacks from third parties, such as man-in-the-middle (MitM) attacks for example.

In an embodiment described herein, secure communications may be performed using the shared keys or shared secrets to identify intended, authenticated entities for sending and/or receiving communications. For example, the shared keys or shared secrets may be used to encrypt and/or sign messages sent between network entities in a manner indicating the authenticity of the network entities.

In an example embodiment, the secure communications described herein may be based on and/or bound to an OpenID authentication protocol. In OpenID authentication, the service provider may be a relying party (RP) and/or the identity provider may be an OpenID identity provider (OP). OpenID authentication may include the use of OpenID and/or a variant called local OpenID where some functionality of the OP in OpenID is performed by a local entity (such as the UE, a gateway, a smart card, a Universal Integrated Circuit Card (UICC), etc.).

Authentication of RPs in OpenID authentication flows is described herein. This may be useful, for example, in cases where a user/UE and the RP may not have a trust relationship, such as may be established using a web site certificate and/or a set of credentials for the UE accessible by the RP from an AAA database for example. Another embodiment may include the establishment of a local OP-RP private shared secret, as described herein.

Local Mobile single sign-on (SSO) is a term used to collectively indicate a part or whole of the SSO and/or related identity management functions, which may traditionally be performed by a web-based SSO server for example, being performed by a locally-based entity or module (e.g., a secure environment residing at the UE, a smart card, or a UICC) which may be a part or whole of the communicating device itself, or where such entity/module is physically and/or logically located (e.g., locally located, such as being connected via a Gateway, etc.) in close vicinity of the communicating device and/or its user. For example, an entity/module may be embedded in a device, attached to the device, and/or connected by local interfaces, wiring, or short-range wireless means to the device.

Local OpenID may be used as a term to indicate a type of Local Mobile SSO whereby the SSO or identity management is based on the OpenID protocol. For example, Local OpenID may be used to indicate the functions of an OpenID Identity Provider (OP or IdP) that may be performed by a locally located entity/module.

Local IdP is a term used to indicate the local entity or module that performs local authentication and/or assertion functions. For example, the local IdP may perform authentication and/or assertion functions of an OpenID server for Local OpenID. The abbreviation $OP_{loc}$ may be used to denote a Local IdP that implements OpenID functionality, however the local IdP may perform similar functions and may not be required to implement the OpenID protocol. One function of a Local IdP may be to facilitate authentication of the user and/or the device through assertion(s) about the identity of the user and/or the device. In an example embodiment, such an authentication assertion may be sent from the Local IdP to a browser agent (BA) running on the device, which may forward the authentication assertion to the external RP. When the function(s) provided by a Local IdP is/are primarily limited to providing such authentication assertion, the Local IdP may be referred to as a Local Assertion Entity (LAE).

A Local IdP may process, create, manage, and/or send authentication assertion messages to one or more external recipients. The authentication assertion messages may assert the state of verification of one or more identities relating to a user and/or a device. For example, in the OpenID protocol, a third-party entity, such as the RP, may be one of the recipients of the authentication assertion message. The Local IdP may also sign authentication assertion messages using cryptographic techniques, such as the shared-key or public/private key varieties for example.

Local OpenID implementations may use one or more cryptographic keys, such as a root session key. The root session key may be intended for use between the RP and the $OP_{loc}$ residing on the UE. Such a key may serve as a root session key between the RP and the OP from which other keys may be derived. Local OpenID methods may also use an authentication assertion key, which may be used to sign one or more of the authentication assertion message(s) for authentication of the user. Such authentication assertion keys may be derived from the root session key.

Local OpenID implementations may use a service called OpenID Server Function (OPSF), whose role may be to generate, share, and/or distribute secrets that may be used by the Local IdP and/or the RP. In an example embodiment, the OPSF and the Local IdP may be viewed by the external RP as a single entity. The OPSF may be able to verify signatures issued by the Local OpenID, and/or may be directly reachable by the RP, for example, via the public internet. The browser on a device may be redirected to the Local IdP by modifying the local DNS resolving module on the device such that the address of the OPSF maps to the local IdP.

OpenID implementations may use a service that facilitates discovery of a Local IdP on behalf of the RP. Such a service may be denoted by OP-agg for example.

Disclosed herein are security systems, methods, and apparatus that may be implemented using OpenID (including, for example, OpenID and/or local OpenID). Some of the embodiments described herein may be implemented at a UE for example. The user equipment may communicate an OpenID request to an OP. The OP may be used to authenticate the UE and/or an RP as further described herein.

Embodiments are described for transparent delegated authentication of an RP to a local OP. In accordance with the embodiments described herein, protocols are disclosed that show how to perform RP authentication using OpenID and/or making use of the local provider of signed authentication assertions, such as an $OP_{loc}$ for example. As described herein, challenge values and/or nonces may be added for replay protection (e.g., steps 112 and 120 of the protocol in FIG. 1).

An aspect of the described implementations to authenticate the RP may include that of delegated authentication by the OPSF node. It may follow a general challenge-response strategy in which $OP_{loc}$ poses a challenge $RP_{Chv}$. This challenge may be encrypted by the OPSF in an appropriate way such that an authentic RP is able to decrypt it. For example, the RP and OPSF may share a secret $K_{r,o}$ which may be used to encrypt and decrypt the challenge.

Figure 2:
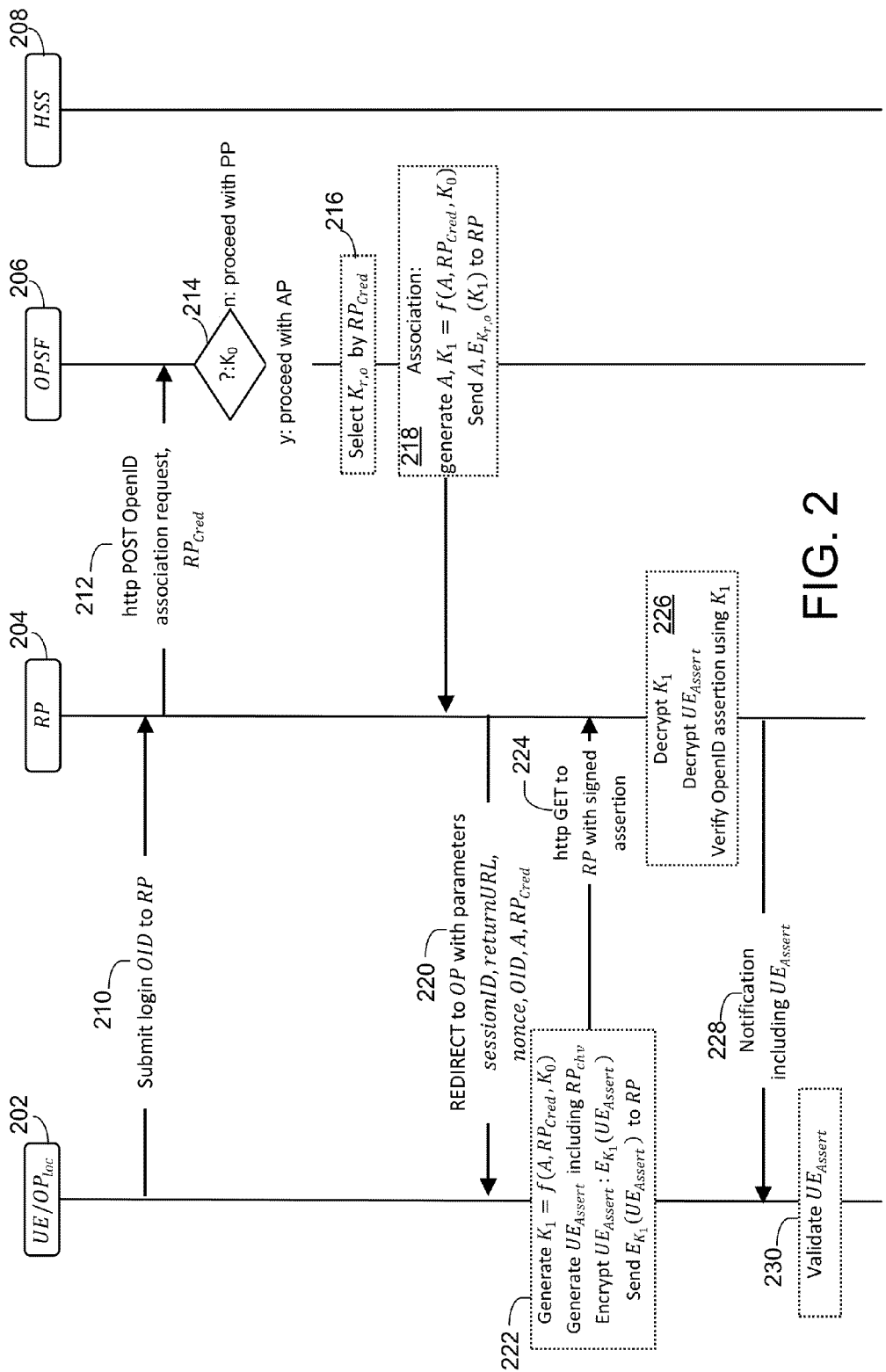
FIG. 2 is an example message flow diagram for an authentication phase using a local identity provider.

FIG. 1 illustrates a message flow diagram of an example provisioning phase (PP). As illustrated in FIG. 1, the provisioning phase may include UE/$OP_{loc}$ 102, RP 104, OPSF 106, and/or Home Subscription Service (HSS) 108. UE/$OP_{loc}$ 102 may submit a login identifier (e.g., OpenID identifier (OID) such as an http address or an email) to RP 104 at 110. The message at 110 may include an RP challenge value $RP_{Chv}$. The RP challenge value $RP_{Chv}$ is a value to which the RP 104 may respond appropriately to prove its authenticity. For example, this may be a random value which may have a one-time use. At 112, RP 104 may send an association request (e.g., http POST OpenID association request) to OPSF 106. The association request may include an RP credential $RP_{Cred}$ that corresponds to RP 104 and/or the RP challenge value $RP_{Chv}$. $RP_{Cred}$ may be an identifier of RP 104 which may allow OPSF 106 to select the correct pre-shared key $K_{r,o}$ that is shared between OPSF 106 and RP 104. $RP_{Cred}$ may be omitted from messaging if OPSF 106 identifies RP 104 by other means (e.g., Internet URL). At 114, the OPSF 106 may determine whether shared secret $K_0$ between the OPSF 106 and UE/$OP_{loc}$ 102 has been provisioned. If so, then the OPSF 106 may proceed to an authentication phase (AP) (e.g., as illustrated in FIG. 2). If not, then the provisioning phase may continue.

At 116, OPSF 106 may select a shared secret $K_{r,o}$ based on $RP_{Cred}$ or another trusted identifier of RP 104 for example. OPSF 106 may perform association with RP 104 at 118. OPSF 106 may generate association handle A and/or signing key S at 118. The signing key S may be generated based on a function of association handle A. OPSF 106 may send association handle A and the signing key S to RP 104. The signing key S may be encrypted with shared key $K_{r,o}$ which may be referred to as $EK_{r,o}(S)$ for example. RP 104 may send a redirect message to UE/$OP_{loc}$ 102 at 120. The redirect message may include parameters, such as the sessionID, the returnURL, a nonce, the login identifier (e.g., OID), and/or association handle A for example. UE/$OP_{loc}$ 102 may send a request (e.g., http GET request) to OPSF 106 at 122. The request (e.g., http GET request) may include parameters, such as the sessionID, the returnURL, a nonce, the login identifier (e.g., OID), and/or association handle A for example.

At 124, OPSF 106 may get authentication vectors and/or other information from HSS 108. OPSF 106 may send an authentication challenge to UE/$OP_{loc}$ 102 at 126. At 128, UE/$OP_{loc}$ 102 may calculate an authentication response and send the authentication response to OPSF 106. At 130, the OPSF 106 may validate the authentication response and generate a shared secret $K_0$ that is shared between the OPSF 106 and UE/$OP_{loc}$ 102. This generation of the shared secret $K_0$ after the validation of the authentication response may bind the establishment of the security association between the UE/$OP_{loc}$ 102 and the OPSF 106 to this authentication. For example, as shown in FIG. 1, this binding may be a procedural binding of the validation of the authentication response to the generation of the shared secret $K_0$. UE/$OP_{loc}$ 102 may generate shared secret $K_0$ at 132. At 134, OPSF 106 may generate an authentication assertion message $UE_{Assert}$ after authenticating the UE/$OP_{loc}$ 102. The authentication assertion may include the $RP_{Cred}$ and $RP_{Chv}$ being encrypted by $K_0$, which may be referred to as $K_0(RP_{Cred}, RP_{Chv})$ for example. This authentication assertion, including $K_0(RP_{Cred}, RP_{Chv})$, may indicate to the UE/$OP_{loc}$ 102 that OPSF 106 has authenticated RP 104, so that UE/$OP_{loc}$ 102 may be assured that it is talking to the legitimate RP 104. In one example embodiment, $RP_{Cred}$ may be a name (or other text value) for the RP 104 which is identifiable by UE/$OP_{loc}$ 102. OPSF 106 may also encrypt authentication assertion message $UE_{Assert}$ with signing key S, which may be referred to as $E_S(UE_{Assert})$ for example. OPSF 106 may send a redirect message to UE/$OP_{loc}$ 102 at 136. The redirect message may redirect UE/$OP_{loc}$ 102 to RP 104 with the signed assertion message. The UE/$OP_{loc}$ 102 may send a request (e.g., http GET request) to RP 104 at 138 with the signed assertion message. At 140, RP 104 may decrypt the signing key S using shared key $K_{r,o}$ and/or verify the authentication assertion message (e.g., OpenID assertion message) using the signing key S by decrypting $E_S(UE_{Assert})$. RP 104 may send a notification to UE/$OP_{loc}$ 102 at 142 that includes authentication assertion $UE_{Assert}$. At 144, UE/$OP_{loc}$ 102 may validate authentication assertion $UE_{Assert}$ by decrypting $RP_{Chv}$ and/or $RP_{Cred}$.

As illustrated in FIG. 1, a protocol may be implemented in which a shared secret $K_0$ between OPSF 106 and UE/$OP_{loc}$ 102 may be established. In an example embodiment, prior to, or during, the provisioning phase, OPSF 106 and UE/$OP_{loc}$ 102 may not yet share a secret. This shared secret may be established when the protocol is run by including a network-based authentication, using a network entity HSS 108 for example. By including $RP_{Chv}$ and $RP_{Cred}$ in $UE_{Assert}$, encrypted with $K_0$, the UE/$OP_{loc}$ 102 may be assured that the received message originated from the RP 104 identified by $RP_{Cred}$. By comparing the identity claimed in $RP_{Cred}$ with the identity of the RP 104, UE/$OP_{loc}$ 102 may verify that no other RP received authentication information and that the RP 104 is the intended RP to which the UE/$OP_{loc}$ 102 desired to perform authentication. The information piece $RP_{Cred}$ in $UE_{Assert}$ may be replaced by some explicit statement $RP_{Assert}$ generated by OPSF 106 to denote the RP 104 identity to UE 102. $UE_{Assert}$ may be a signed OpenID assertion message, signed with a signing key S.

FIG. 1 also illustrates that the RP 104 may be authenticated (e.g., implicitly authenticated) to UE/$OP_{loc}$ 102. RP 104 may perform OpenID authentication of UE/$OP_{loc}$ 102 if it is the authentic RP identified by $RP_{Cred}$ (since then is it able to decrypt signing key S). The unique UE/OP$_{loc}$ 102 which is authenticated in the protocol by OPSF 106 to RP 104, may authenticate RP 104. In an example embodiment, the protocol flow may be unmodified from a local OpenID authentication. Also, network authentication may remain unaffected. Additional cryptographic operations may be implemented at one or more parties in the protocol to ensure further protection.

As for a possible implementation for interworking of a local OpenID with a Generic Bootstrapping Architecture (GBA) (e.g., 3GPP GBA), a protocol may be implemented if a pre-shared secret K$_0$ between UE/OP$_{loc}$ 102 and OPSF 106 exists.

FIG. 2 illustrates an example message flow diagram of an Authentication Phase (AP). For example, the authentication phase may implement UE/OP$_{loc}$ 202, RP 204, OPSF 206 and/or HSS 208. The protocol flow illustrated in FIG. 2 may be applied independently, or in conjunction with the protocol provisioning phase (PP) described in FIG. 1 for establishment of a secure channel using a shared secret between UE/OP$_{loc}$ 102 and OPSF 106, such as if it does not already exist as a pre-shared key for example.

As illustrated in FIG. 2, UE/OP$_{loc}$ 202 may submit a login identifier (e.g., OpenID identifier (OID) such as an http address or an email) to RP 204 at 210. At 212, RP 204 may send an association request (e.g., http POST OpenID association request) to OPSF 206. The association request may include the RP credential RP$_{Cred}$ identifying RP 204. At 214, OPSF 206 may determine whether shared key K$_0$ has been determined or provisioned, and if not, the protocol may proceed with the provisioning of K$_0$ in the provisioning phase. If K$_0$ has already been provisioned, the protocol may proceed with the authentication phase. For example, at 216 the OPSF 206 may select shared key K$_{r,o}$ based on the RP$_{Cred}$ corresponding to RP 204. At 218, the OPSF 206 may perform association with RP 204. OPSF 206 may generate association handle A and/or shared key K$_1$. Shared key K$_1$ may be a shared key between OPSF 206, UE/OP$_{loc}$ 202, and/or RP 204 that is generated from a function of association handle A, RP$_{Cred}$, and/or shared key K$_0$ for example. For example, the UE/OP$_{loc}$ 202 and/or the OPSF 206 may be configured to generate the shared key K$_1$. The RP 204 may receive the shared key K$_1$ and use it for secure communications with the UE/OP$_{loc}$ 202. OPSF 206 may send association handle A and an encrypted K$_1$ to RP 204, where K$_1$ is encrypted by shared key K$_{r,o}$, which may be referred to as EK$_{r,o}$ (K$_1$) for example. RP 204 may send a message to UE/OP$_{loc}$ 202 at 220 that includes parameters, such as a sessionID, a returnURL, a nonce, a login identifier (e.g., OID), association handle A, and/or RP$_{Cred}$. The message at 220 may be a redirect message that redirects UE/OP$_{loc}$ 202 to RP 204 for example. At 222, UE/OP$_{loc}$ 202 may generate K$_1$. For example, K$_1$ may be generated from a function of association handle A, RP$_{Cred}$, and/or K$_0$. UE/OP$_{loc}$ 202 may perform a local authentication at 222 and may generate authentication assertion message UE$_{Assert}$ including RP$_{Chv}$ and/or may encrypt UE$_{Assert}$ with key K$_1$, which may be referred to as EK$_1$(UE$_{Assert}$) for example, at 222. UE$_{Assert}$ may be an OpenID assertion message for example. UE/OP$_{loc}$ 202 may send the encrypted assertion message UE$_{Assert}$ to RP 204. At 224, UE/OP$_{loc}$ 202 may send a request (e.g., http GET request) to RP 204 with the signed assertion. RP 204 may decrypt K$_1$ using K$_{r,o}$ at 226. RP 204 may decrypt authentication assertion message UE$_{Assert}$ at 226 using decrypted K$_1$. RP 204 may verify OpenID assertion using shared key K$_1$. At 228, RP 204 may send a notification to UE/OP$_{loc}$ 202 that includes authentication assertion message UE$_{Assert}$. UE/OP$_{loc}$ 202 may validate the authentication assertion message UE$_{Assert}$ at 230.

By validating that information in the UE$_{Assert}$ received at 228 matches the information in the UE$_{Assert}$ sent at 224, UE/OP$_{loc}$ 202 may be assured that the received message at 228 originated from the RP 204 identified by RP$_{Cred}$ and to which it submitted the login information at 210. For example, by comparing the identity claimed in RP$_{Cred}$ with the identity of the RP 104, UE/OP$_{loc}$ 202 may verify that no other RP received authentication information and that the RP 104 is the intended RP to which the UE/OP$_{loc}$ 202 desired to perform authentication.

Freshness of authentication may be ensured by including a fresh challenge RP$_{Chv}$ in UE$_{Assert}$. UE/OP$_{loc}$ 202 may validate the received UE$_{Assert}$ by verifying that it includes this challenge value, which RP 204 may know if it is able to decrypt UE$_{Assert}$ with the genuine K$_1$, which may be shared by UE/OP$_{loc}$ 202 and RP 204. Use of the genuine K$_1$ may prove that RP 204 is in possession of K$_{r,o}$ shared by the OPSF 206 and the RP identified by RP$_{Cred}$.

According to an example embodiment, RP authentication may be performed using the OP without local OpenID (e.g., using non-local OpenID). The inclusion of RP authentication in the OpenID protocol may include changes to the OpenID protocol itself and/or changes to the implementations of the OP and/or RP. RP authentication may add security benefits, such as providing a countermeasure to possible attacks by a fake or rogue RP for example. Implementation on the UE for OpenID (or local OpenID) may not be affected by any such RP authentication. For example, the UE may not incorporate local OP functionality and may not be able to send the challenge RP$_{Chv}$ to the RP in an embodiment. RP authentication may include a challenge response step between the OP and the RP, where the OP may send a challenge with a proof of freshness to the RP (e.g., via an encrypted nonce). The RP may use the pre-established shared secret K$_{r,o}$ to decrypt this nonce and return the answer to the OP. Alternatively, or additionally, the nonce may be unencrypted, and be signed by the RP in its answer. The response to the authentication challenge may be as a direct response to the OP authentication challenge, or it may be integrated in the redirect message, which may send the UE to the OP for example. In either case, the OP may have reliable evidence on authentication of the RP before engaging in UE authentication. This may allow the stoppage of the protocol in the case of a failed RP authentication, and/or save communication effort between the UE and the OP in the case of such a failed RP authentication. The OP may then directly convey the information on the failed RP authentication to the UE.

Figure 3:
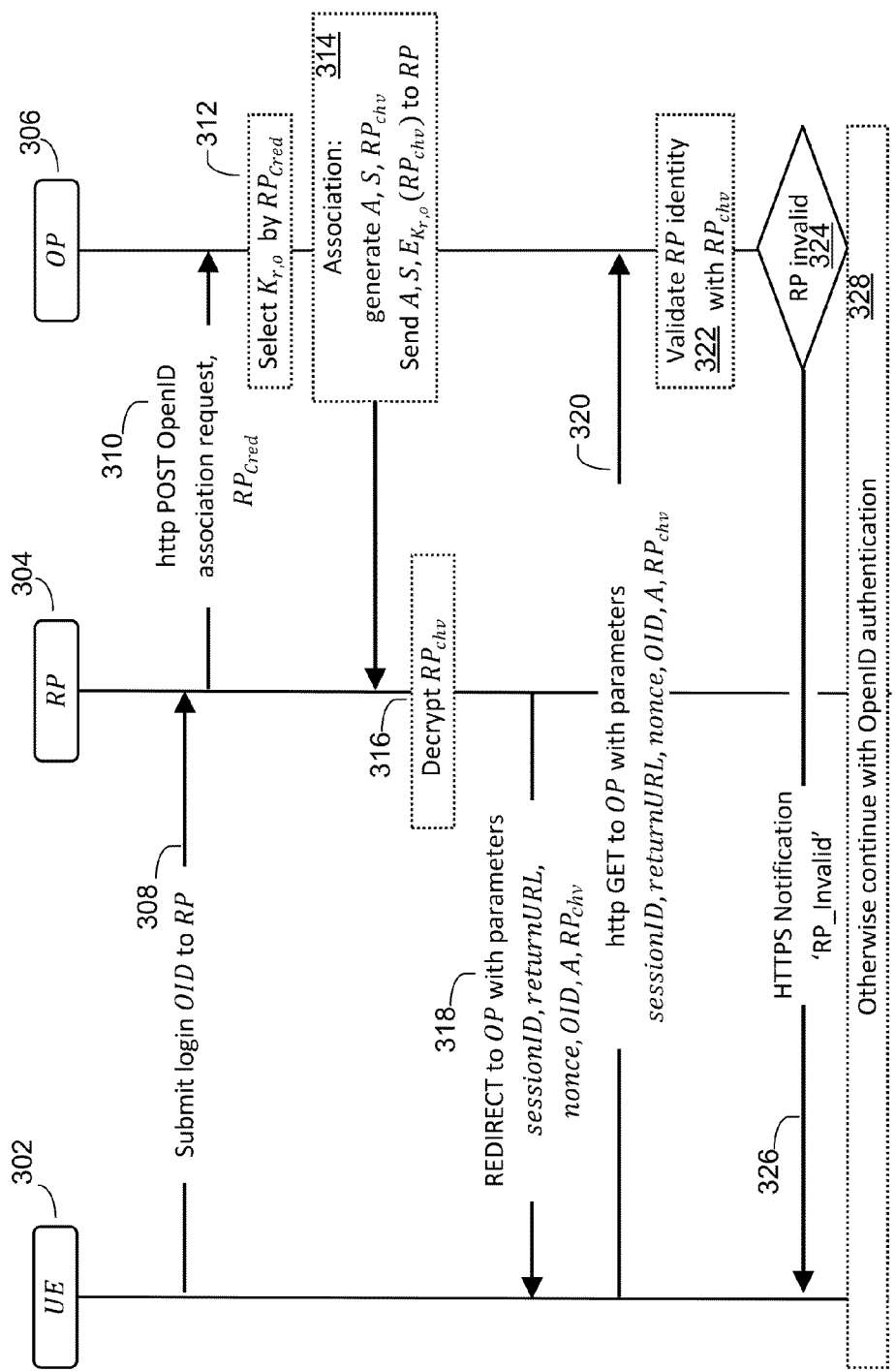
FIG. 3 is an example message flow diagram for a message exchange for service provider authentication.

FIG. 3 illustrates a message flow diagram of an example portion of the message exchange for RP 304 authentication. The message flow diagram includes communications between UE 302, RP 304, and OP 306. In case of authentication failure, the OP 306 may force Hypertext Transfer Protocol Secure (HTTPS) communication with UE 302 and/or notify the UE 302 of the failure. Otherwise, OpenID authentication may proceed.

As illustrated in FIG. 3, UE 302 may submit a login identifier (e.g., OID) to RP 304 at 308. RP 304 may send an association request (e.g., http POST OpenID association request) at 310 to OP 306. The association request at 310 may include RP$_{Cred}$. At 312, OP 306 may select the shared secret K$_{r,o}$ between OP 306 and RP 304 based on RP$_{Cred}$ or another trusted identifier of RP 304 for example. OP 306 may perform association with RP 304 at 314. At 314, OP 306 may generate association handle A, signing key S, and/or RP$_{Chv}$. RP$_{Chv}$ may be encrypted using K$_{r,o}$, which may be referred to as EK$_{r,o}$ (RP$_{Chv}$) for example. OP 306 may send the association handle A, signing key S, and/or EK$_{r,o}$(RP$_{Chv}$) to RP 304.

RP 304 may decrypt $RP_{Chv}$ at 316 using shared key $K_{r,o}$. At 318, RP 304 may send a message to OP 306, via UE 302, which may include parameters, such as the sessionID, returnURL, a nonce, a login identifier (e.g., OID), association handle A, and/or $RP_{Chv}$. For example, the message at 318 may include a redirect message, which may redirect UE 302 to OP 306. UE 302 may send a message (e.g., an http GET request) to OP 306 at 320. The message at 320 may include parameters such as the sessionID, the return URL, the nonce, the login identifier (e.g., OID), association handle A, and/or $RP_{Chv}$. At 322, OP 306 may validate RP 304's identity with $RP_{Chv}$. If RP 304's identity is determined to be invalid at 324, OP 306 may send a notification at 326 to UE 302 indicating the RP 304 invalidity (e.g., via an HTTPS notification indicating that RP 304 is invalid). If RP 304's identity is valid, authentication (e.g., OpenID authentication) may continue at 328 and/or OP 306 may send a notification indicating RP 304's identity is valid (not shown).

In another embodiment, if the RP 304 establishes a security association with the OP 306, the corresponding steps may be modified to incorporate the challenge from the OP 306 into the protocol for establishing the security association. During the association establishment, the OP 306 and RP 304 may set up a message authentication code (MAC) key which may be used to sign the authentication assertion message $UE_{Assert}$. This key may be sent encrypted using a temporary secret key which may be negotiated between OP 306 and RP 304 (e.g., using Diffie-Hellman (DH) procedure). In addition to the temporary secret key, the OP 306 may include a nonce in response to the RP 304. This nonce may be encrypted with the temporary secret key (e.g., DH-key) for example.

The RP 304 may decrypt the nonce and/or the MAC key based on the negotiated key (e.g., DH-key). The RP 304 may use its own pre-established $K_{r,o}$ key to encrypt or sign the nonce as received from the OP 306. The RP 304 may add this key as a parameter to the redirect message which may be sent to the UE 302 for example. Since the UE 302 may follow the redirect to the OP 306, the OP 306 may receive the signed or encrypted nonce, and may use the shared key $K_{r,o}$ to authenticate the RP 304. In the case of a failed authentication, the OP 306 may send an alert message to the UE 302 to protect it from unauthenticated RPs. In the case of a successful RP authentication, the OP 306 may proceed with the protocol.

In an example embodiment, the OP 306 may be able to send information to the RP 304 where no association is established between OP 306 and RP 304 (e.g., a stateless mode in OpenID). In the stateless mode, information may be exchanged between the OP 306 and the RP 304, such as during discovery for example. However, it may not be guaranteed that the discovery involves the OP 306 (e.g., in the case of delegated discovery, where the user identifier may be for example at http://myblog.blog.com, and/or may point to the OpenID OP endpoint URL at the OP at http://myblog.myopenid.com). Hence, the OP 306 at myopenid.com may not be involved in the discovery directly and may not be able to authenticate the RP 304 at this stage.

If the OP 306 is able to provide information during the discovery steps to the RP 304 (e.g., the user identifier page may be hosted at the OP 306 itself), the OP 306 may dynamically generate a nonce as part of the discovery information page and/or associate it with the identifier (e.g., URL or email address) of the HTTP requesting RP 304. The OP 306 may expect the RP 304 to sign or encrypt this nonce and/or include the information in the redirect message.

The OP 306 may force the use of HTTPS. For example, the UE 302 may be redirected to the use of HTTPS by the OP 306 such that any subsequent communication between the UE 302 and the OP 306 may be protected using HTTPS. This feature may be explicitly allowed by OpenID standards embodiments, such as OpenID Authentication 2.0 for example. Such a protection may enable the prevention of man-in-the-middle (MitM) attacks on the OpenID authentication challenge message from the OP 306 to the UE 302 for example. It may allow an alert message to be sent in the case of a failed RP authentication to the UE 302 in a protected manner.

Example embodiments are described herein for a split terminal implementation. The split terminal implementation may refer to a scenario where two entities may reside on the user side of the network. For example, an Authentication Agent (AA) and a Browsing Agent (BA) may be associated with and/or reside on a UE, such as UE 302 for example. The AA may perform the steps for authentication, while the BA may be the viewer or consuming entity of the service. In an example of the split terminal implementation, a user may open a browser to retrieve some service (e.g., a website) from an RP, such as RP 304 for example. The RP 304 may perform some steps (e.g., association and/or discovery) with the OP 306 and the user's AA. For example, the UE 302 may be contacted by the OP 306. The OP 306 and the UE 302 may perform the authentication, for example, based on GBA network credentials, which may not be known to the BA. The BA may obtain access to the service at the RP 304, such as if the authentication between OP 306 and the AA was successful for example. There may be multiple variants that may be implemented. Each variant may include a physical channel between the AA and the BA, which may be a local interface (e.g., BLUETOOTH®, etc.) or a logical channel for example. The logic channel may be created by the user entering information shown on the AA into the BA, such that the two sessions may be logically combined for example.

The Mobile Network Operator's (MNO's) own services and/or third party service provider's services may be provided to the UE 302, or to devices which are known to the MNO. If MNOs want to enable users to connect different/multiple devices with a sole authenticator (e.g., the UE 302) a split terminal implementation may be used.

Example options for the split terminal implementation may include those where a cryptographic binding between the two sessions is created. Implementations may also include scenarios where the AA displays credential information to the user, which the user may enter in the BA to authenticate towards the RP 304 (e.g., using the logical channel described herein).

As an alternative, or addition, the credentials may be sent over a secured local link between the BA and the AA (e.g., using the physical channel described herein). In this implementation, the AA may be used as an authentication token/password generator. In an example embodiment, the BA may receive the shared key $K_1$ and authentication assertion message $UE_{Assert}$, which may be encrypted by $K_{r,o}$ and may be referred to as $EK_{r,o}(K_1, UE_{Assert})$ for example, from the AA and send them to the RP 304. This information may be used by the RP 304 to authenticate the user. In an example embodiment, a split terminal implementation may be set up with a local assertion provider, which generates the authentication assertion message $UE_{Assert}$ inside the UE 302/AA.

Added security functions may be implemented depending on an authentication based on local OpenID. Authentication may be based on local OpenID to provide a private secret (e.g., encryption key E illustrated at 410 and 414 in FIG. 4). This secret may be used, for example, to establish a private, secure channel between the $OP_{loc}$, and/or the trusted environment in which it resides (e.g., a smart card or other trusted computing environment), and the RP. Alternatively, the secure channel may have an endpoint in some relatively non-secured part of the UE, which may be referred to as the UE platform.

Described herein is an option to bind such a secure channel to a local OpenID authentication. In an example embodiment, the secure channel may be established with a UE platform and the RP and local OpenID authentication may be performed inside this secure channel. This example embodiment may be sufficient for some implementations, but may not meet the security demands of others. For example, a UE platform which establishes the secure channel may be less secure than the trusted environment (e.g., a smart card or other trusted computing environment) on which the $OP_{loc}$ resides. Private data coming from the same trusted environment and directed toward the RP may travel on a channel which has a relatively insecure inner node in the UE. Therefore, an alternative embodiment may be implemented which may allow the $OP_{loc}$, and/or the trusted computing environment on which it resides, to exchange secrets with the RP independent of the properties of the UE platform, and to bind such privacy properties of a message to the local OpenID authentication to the RP.

Figure 4:
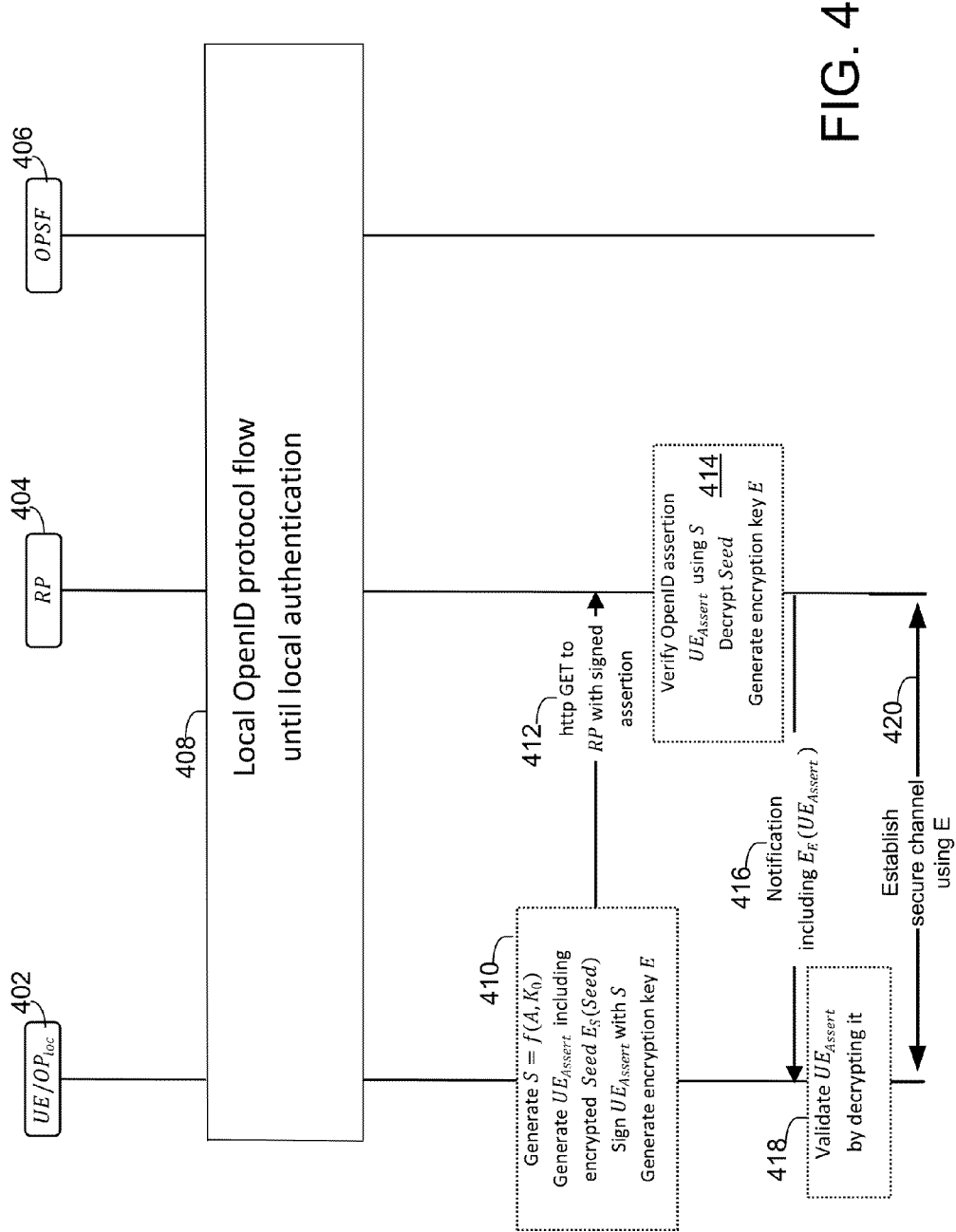
FIG. 4 is another example message flow diagram for a message exchange for service provider authentication.

FIG. 4 illustrates a message flow diagram of an example embodiment of creating and/or implementing a secure channel between a local authentication entity, such as UE/$OP_{loc}$ 402 for example, and an RP 404. The flow diagram illustrated in FIG. 4 includes communications between UE/$OP_{loc}$ 402, RP 404, and/or OPSF 406. As indicated at 408, a local OpenID authentication may be performed up to the point at which UE/$OP_{loc}$ 402 generates the signed authentication assertion at 410. At 410, UE/$OP_{loc}$ 402 may generate a signing key S, which may be derived from a function of association handle A and shared key $K_0$ using a key derivation function (KDF). Shared key $K_0$ may be shared between UE/$OP_{loc}$ 402 and OPSF 406 for secure communications. The signing key S may be an OpenID signing key for example. The UE/$OP_{loc}$ 402 may perform a local authentication and authentication assertion message $UE_{Assert}$ may be generated at 410 and may include an encrypted seed value (Seed). The Seed may be used for hiding a shared secret between two or more parties. For example, the shared secret may be hidden because the shared secret may not be transmitted between parties. The Seed may instead be transferred and used to derive the shared secret (e.g., locally) at each of the parties to which the secret is shared.

The authentication assertion message $UE_{Assert}$ may be an OpenID assertion for example. UE/$OP_{loc}$ 402 may encrypt the Seed with the signing key S (referred to as $E_S$(Seed)), which may be private to OPSF 406, UE/$OP_{loc}$ 402, and/or RP 404. In an alternative embodiment, UE/$OP_{loc}$ 402 may encrypt the Seed using a key derived from S in a pre-determined way. UE/$OP_{loc}$ 402 may generate the encryption key E from the Seed in a pre-determined way, which may be known to RP 404 for example. UE/$OP_{loc}$ 402 may sign the authentication assertion message $UE_{Assert}$ with the signing key S. This generation of the encryption key E from the local authentication may bind the establishment of the secure channel between the UE/$OP_{loc}$ 402 and the RP 404 to this local authentication.

At 412, the UE/$OP_{loc}$ 402 may send a message (e.g., an http GET request) to RP 404 with the signed assertion $UE_{Assert}$. RP 404 may verify the authentication assertion message $UE_{Assert}$ and use the signing key S to decrypt the Seed information at 414. The RP 404 may generate encryption key E based on the Seed information. For example, the RP 404 may generate the encryption key E from the Seed information in a pre-determined way, which may be known to UE/$OP_{loc}$ 402. Encryption key E may be private to UE/$OP_{loc}$ 402 and RP 404.

RP 404 may encrypt the previously verified authentication assertion $UE_{Assert}$ with encryption key E and send it back to UE/$OP_{loc}$ 402. For example, at 416, RP 404 may send a notification to UE/$OP_{loc}$ 402 that includes the authentication assertion message $UE_{Assert}$, which may be encrypted with encryption key $E(E_E(UE_{Assert}))$ for example. This may provide confirmation of secret establishment to UE/$OP_{loc}$ 402. UE/$OP_{loc}$ 402 may validate the authentication assertion message $UE_{Assert}$ at 418 by decrypting it using encryption key E. By validating that information in the $UE_{Assert}$ received at 416 matches the information $UE_{Assert}$ sent at 412, UE/$OP_{loc}$ 402 may be assured that the received message at 416 originated from the intended RP 404. For example, by comparing the Seed in the notification received from the RP 404 at 416 with the Seed included in the $UE_{Assert}$ at 410, UE/$OP_{loc}$ 402 may verify that no other RP received authentication information and that the RP 404 is the intended RP to which the UE/$OP_{loc}$ 402 desired to perform authentication. The UE/$OP_{loc}$ 402 may trust in this verification at 418 as an indication that the RP 404 obtained the key S by which RP 404 is able to decrypt the Seed and derive E. At 420, encryption key E may be used (e.g., in another protocol) to establish a secure channel between the UE/$OP_{loc}$ 402 and the RP 404. One example protocol that may be used to establish this secure channel may include the TLS-PSK protocol, which may be a variant of the common TLS protocol which accepts a pre-shared key as input and realizes a secure channel based on the pre-shared key. One example embodiment of the TLS-PSK is illustrated, by the Internet Engineering Task Force (IETF), in Request for Comments (RFC) documents 4279 and 4785.

As illustrated in FIG. 4, derivation of encryption key E may be performed using knowledge of the Seed and the KDF, which may be public. The Seed may be known to the RP 404, and may be protected from others, since it is encrypted with signing key S. S may be revealed to RP 404 by OPSF 406 over a secure channel, such as a certificate-based transport layer security (TLS) for example. UE 402 may obtain confirmation of RP 404 possessing signing key S, since RP 404 may send $E_E(UE_{Assert})$ back to UE 402, which RP 404 may be able to do if it is able to decrypt Seed. Therefore, UE 402 may obtain key confirmation from RP 404. The protocol flow illustrated in FIG. 4 may be combined with an RP authentication protocol, such as the RP authentication protocols described herein, to enable secure communications.

While it is illustrated that Seed information may be used to derive a private, shared key between entities, a private, shared key may be derived in other ways. For example, embodiments may implement Diffie-Hellman key establishment.

As described herein, some initial value, such as the Seed for example, may be transferred between the entities wishing to establish the shared secret. Encryption of the Seed may be used to protect the Seed from man-in-the-middle attacks. Specific encryption with the signing key S, or a key derived from S, may be used for binding to the local OpenID authentication. The encrypted notification message may be used to bind to the local OpenID authentication. This may add the feature of confirmation toward the UE/$OP_{loc}$ 402 of the establishment of the secret.

The establishment of the secret may begin earlier in the local OpenID protocol flow by the RP 404 sending an encrypted Seed in a redirect message to the UE/$OP_{loc}$ 402.

In another embodiment, the RP 404 may be an intermediate node on the path to the endpoint of the desired secure channel. In this case, RP 404 may receive Seed from this endpoint, which may be a server with which UE/OP$_{loc}$ 402 may wish to establish the secure channel and to which RP 404 may act as an authentication, and optionally an authorization, gateway. Encryption key E may be used in another protocol to establish a secure channel between the UE/OP$_{loc}$ 402, or the UE platform, and the RP 404. A candidate protocol for using the encryption key E in such a manner may include the TLS-PSK protocol, which may be a variant of the TLS protocol which accepts a pre-shared key as input and realizes a secure channel based on it. In some embodiments, the establishment of the secret may be combined with RP authentication.

Figure 5:
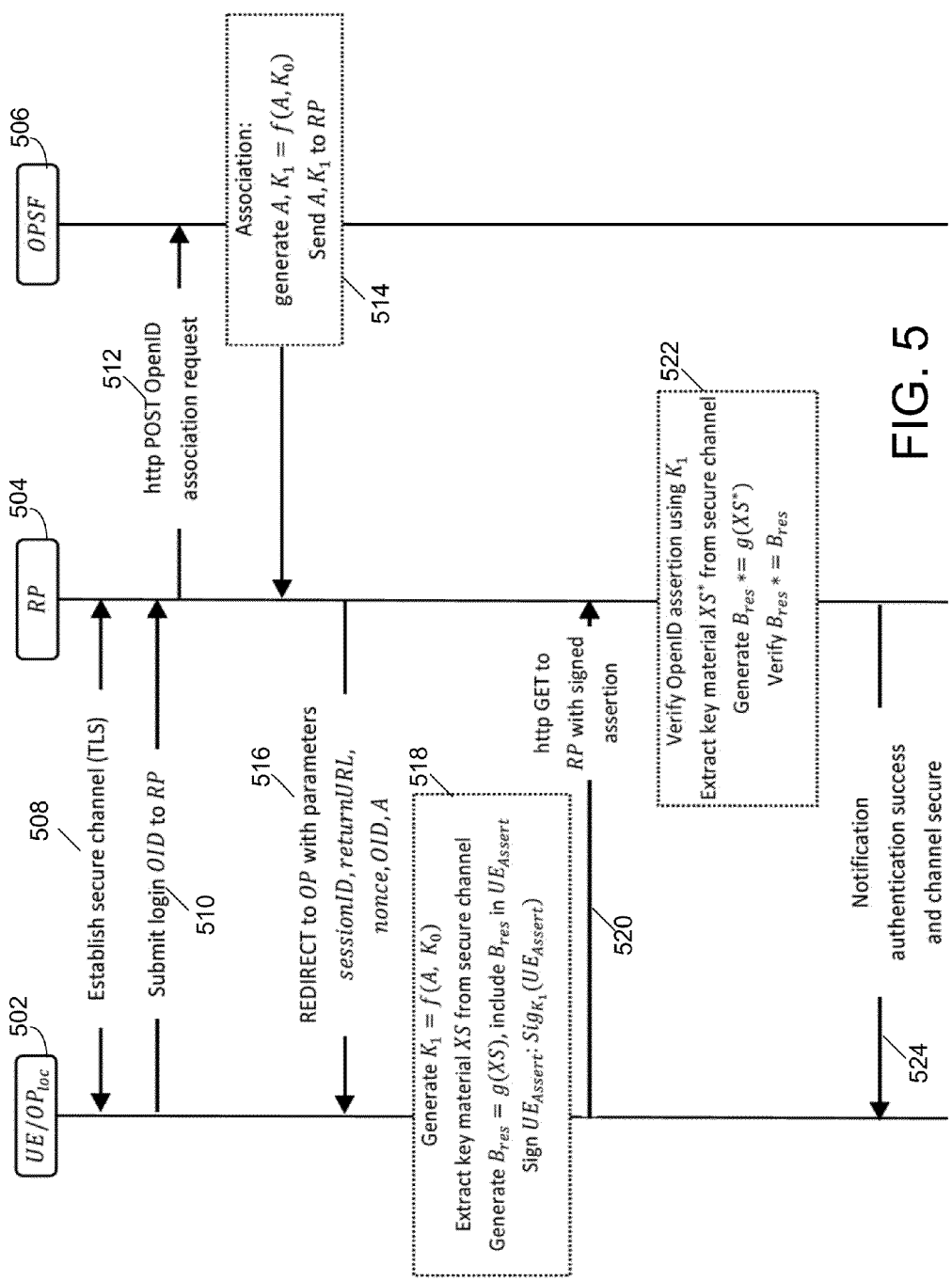
FIG. 5 is an example message flow diagram illustrating the establishment of a secure channel for local identity provider authentication using a pre-established secure channel between a UE and a service provider.

FIG. 5 is a flow diagram illustrating the establishment of a secure channel for local OpenID authentication using a UE-RP pre-established secure channel with post-authentication key confirmation. For example, secure channel establishment may allow the UE/OP$_{loc}$ 502, or the UE platform, and the RP 504 to establish a secure channel and proceed with local OpenID authentication. The flow diagram illustrated in FIG. 5 may be used to confirm the secure channel keys toward the RP 504 during authentication, and may be bound to authentication for example. This may be done by extracting key material XS from the secure channel, such as a transport-layer security (TLS) tunnel for example, and/or deriving a binding response B$_{res}$ from it.

As illustrated in FIG. 5, UE/OP$_{loc}$ 502 and RP 504 may establish a secure channel at 508. For example, the secure channel may be established using TLS. At 510, the UE/OP$_{loc}$ 502 may submit a login identifier (e.g., OID) to the RP 504. RP 504 may send an association request (e.g., http POST OpenID association request) to OPSF 506 at 512. The OPSF 506 may perform association with RP 504 at 514. For example, the OPSF 506 may generate an association handle A and/or a shared key K$_1$. The shared key K$_1$ may be a shared key between OPSF 506, RP 504, and/or UE/OP$_{loc}$ 502. The shared key K$_1$ may be derived from association handle A and/or shared key K$_0$. OPSF 506 may send association handle A and/or shared key K$_1$ to RP 504.

At 516, RP 504 may send a redirect message to UE/OP$_{loc}$ 502 which redirects UE/OP$_{loc}$ 502 to the OP, which resides locally on the UE/OP$_{loc}$ 502. The redirect message may include parameters such as a sessionID, a returnURL, a nonce, the login identifier (e.g., OID), and/or the association handle A. At 518, UE/OP$_{loc}$ 502 may perform a local authentication and may generate the shared key K$_1$. The shared key K$_1$ may be generated from association handle A and/or shared key K$_0$. This generation of the shared secret K$_1$ from the local authentication may bind the establishment of the secure channel 508 between the UE/OP$_{loc}$ 502 and the RP 506 to this local authentication. The UE/OP$_{loc}$ 502 may extract key materials XS from the secure channel and may generate a binding response B$_{res}$ from XS (B$_{res}$=g(XS)). According to an example embodiment, the derivation of the binding response B$_{res}$ may be done by using a MAC algorithm with an additional nonce, such as the association handle A for example. The UE/OP$_{loc}$ 502 may include the binding response B$_{res}$ in the authentication assertion message UE$_{Assert}$. B$_{res}$ may be included in the extension fields of the authentication assertion message UE$_{Assert}$, as permitted by OpenID for example. The authentication assertion message UE$_{Assert}$ may be signed by the UE/OP$_{loc}$ 502 using the shared key K$_1$, which may be referred to as SigK$_1$(UE$_{Assert}$) for example. At 520, the UE/OP$_{loc}$ 502 may send the signed assertion message SigK$_1$ (UE$_{Assert}$) to the RP 504. For example, the signed assertion message may be sent in an http GET request. In an example embodiment, the XS may not be used directly in the message to RP 504, since this may leak information concerning the secure channel to an attacker.

The RP 504 may verify the signed assertion SigK$_1$(UE$_{Assert}$) at 522 using shared key K$_1$. After successfully verifying the authentication assertion from the UE/OP$_{loc}$ 502 for example, the RP 504 may derive a comparison value B$_{res}$* from the RP 504's owns secure channel key material XS* and find that it coincides with the received B$_{res}$. For example, the RP 504 may extract the key materials XS* from the secure channel, generate a binding response B$_{res}$* from the key materials XS* (B$_{res}$*=g(XS*)), and verify that binding response B$_{res}$* is equal to the binding response B$_{res}$ indicated in the signed assertion. The RP 504 may know that the authenticated party is the secure channel endpoint, since it is in possession of the correct secure channel keys for the channel over which the authentication protocol was run, which may be used as key confirmation of the secure channel keys. If the RP 504 verifies that the binding response B$_{res}$* equals the binding response B$_{res}$, then authentication may be determined successful and the channel between UE/OP$_{loc}$ 502 and RP 504 may be secure. At 524, RP 504 may send a notification to UE/OP$_{loc}$ 502 indicating that authentication is successful and that the channel is secure.

As illustrated in FIG. 5, the secure channel may be established using TLS. The UE/OP$_{loc}$ 502 and the RP 504 may include within the protocol a key confirmation which may assure the RP 504 that the authenticated (e.g., by OpenID authentication) party may also be the endpoint of the previously established secure channel. The example embodiment illustrated in FIG. 5 may include the use of the OP$_{loc}$ as a trust anchor for the key confirmation, and the secure channel establishment, as well as the authentication. Embodiments attempting to achieve the same, or similar, security without the use of an OP$_{loc}$ (e.g., using an external OP) may incur additional communication steps between RP 504 and a network OP. The example embodiment illustrated in FIG. 5 may mitigate man-in-the-middle (MitM) attacks, such as the attack in which the MitM establishes itself initially at the set-up of the secure (TLS) channel, for example, as a TLS relay. The embodiments described herein may make the MitM explicitly detectable by the RP 504.

If it is not desired to use an extension field of the authentication assertion, then XS may be used for key confirmation. For example, UE/OP$_{loc}$ 502 may derive a signing key K$_1$'=g (K$_1$,XS) (not shown) and uses it to sign the authentication assertion. RP 504 may do the same to verify the signed assertion. Upon success, the RP 504 may achieve authentication and key confirmation for the secure channel concurrently. This may come at the cost of reduced semantics, since presence of the MitM may no longer be discernible from failure of the authentication.

The embodiments illustrated in FIG. 5 may be combined with RP authentication, such as the RP authentication embodiments described herein for example. For example, the assurance of channel security may be one-sided as illustrated in the protocol in FIG. 5. To make it two-sided, the protocol may be combined with the RP authentication protocol, such as the RP authentication protocols illustrated in FIGS. 2 and 3 for example. For this, the UE/OP$_{loc}$ 502 may include the encrypted challenge value EK$_1$(RP$_{Chv}$) in the authentication assertion message. If K$_1$ was never divulged to an MitM, the UE/OP$_{loc}$ 502, upon receiving the notification including RP challenge value RP$_{Chv}$, may assume that a valid RP 504 has performed successful evaluation of B$_{res}$, and thus an MitM may not be present. Thus, if the RP 504 is in possession of the correct K$_1$, it may decrypt RP$_{Chv}$.

In another embodiment, the RP 504 may have knowledge of binding response B$_{res}$. For example, B$_{res}$ may be used to encrypt the RP challenge value RP$_{Chv}$ in the notification that is returned to the UE/OP$_{loc}$ 502 at 524. The UE/OP$_{loc}$ 502 may use K$_1$', rather than K$_0$ or K$_1$ for example, to encrypt RP$_{Chv}$ inside the authentication assertion message UE$_{Assert}$. Then RP 504 may extract RP$_{Chv}$ if it is in possession of a K$_1$' derived from the correct XS value.

The authentication and key agreement protocols described herein may include various implementations for protection from attacks, such MitM attacks for example. One way to provide such protection is to establish a secure channel, which may be called an outer channel, such as a TLS tunnel for example, before the authentication flow. The authentication may be performed inside this secure channel. For example, the protocol referred to as GBA_H may be sufficiently secure against an attack with respect to the outer authentication protocol established by the TLS tunnel. GBA_H may include an authentication procedure which is based on HTTP digest over a TLS for example. One example embodiment of GBA_H is illustrated in 3rd Generation Partnership Project (3GPP) Technical Specification (TS) number 33.220.

Figure 6:
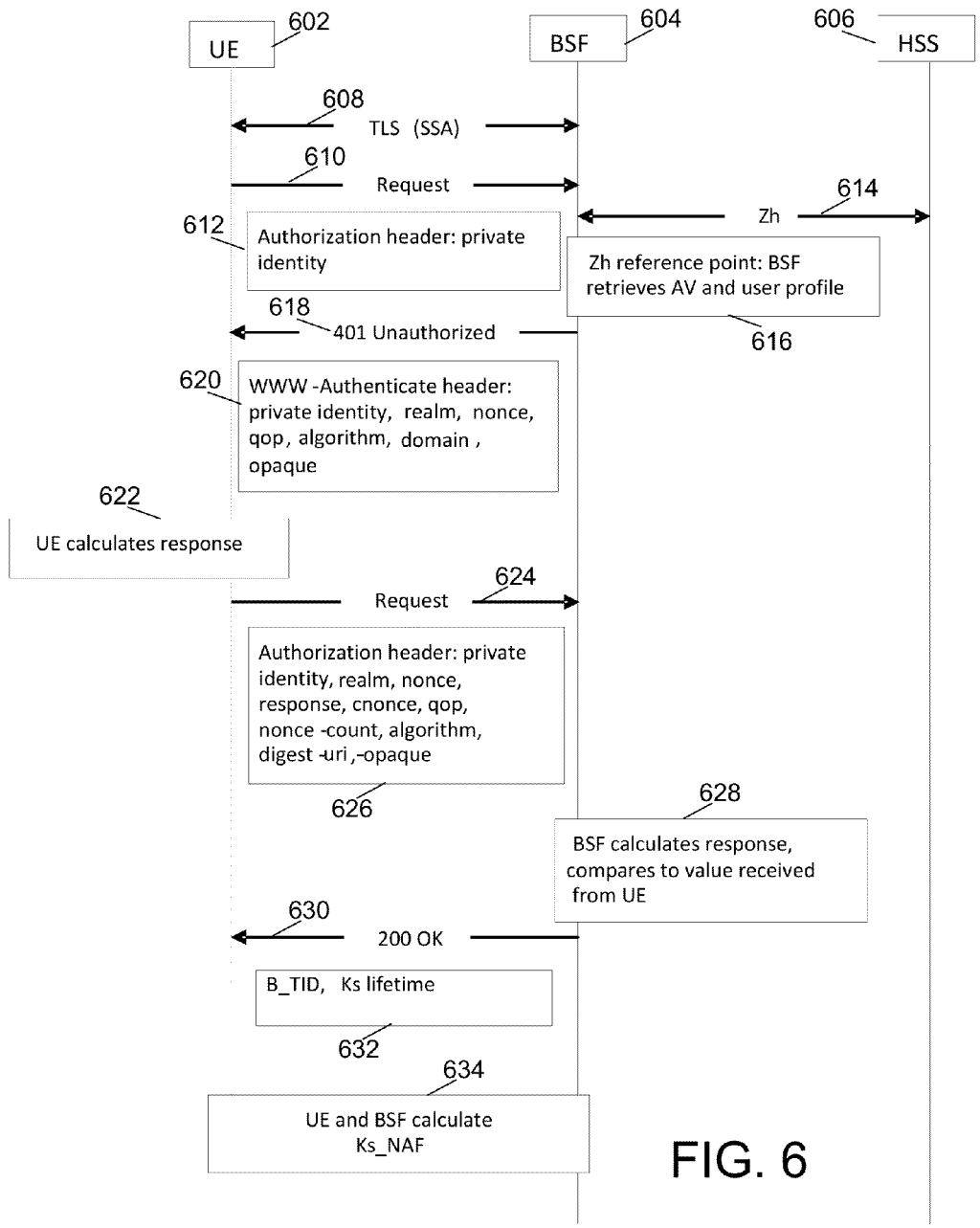
FIG. 6 is an example message flow diagram for an example of a Generic Bootstrap Architecture (GBA/GBA_H) protocol.

FIG. 6 illustrates a message flow diagram showing an example of the GBA_H protocol using HTTP-SIP digest. As illustrated in FIG. 6, communications may be performed using a UE 602, a BSF 604, and/or an HSS 606. At 608, the UE 602 may establish a TLS tunnel with BSF 604. The UE 602 may send a request to BSF 604 at 610, using the TLS tunnel for example. The request at 610 may include an authorization header comprising a private identity, as illustrated at 612. BSF 604 and HSS 606 may use the Zh reference point at 614 to exchange authentication information. For example, as illustrated at 616, the Zh BSF 604 may use the Zh reference point to retrieve authentication vectors (AVs) and/or user profile information from HSS 606.

At 618, BSF 604 may send an authentication challenge (e.g., an authentication challenge in an HTTP 401 unauthorized response) to UE 602. As illustrated at 620, the message at 618 may include private identity information, a realm, a nonce, a quality of protection (qop) value, an authentication algorithm, a domain, and/or an opaque. In an example embodiment, this information may be included in the authentication header of the message. The private identity information may include the identity which the network uses to identify the user. This private identity may enable the network to retrieve the user profile and/or the authentication vector for the challenge. In an example embodiment, the realm, nonce, qop value, authentication algorithm, domain, and/or opaque may be illustrated, by the IETF, in RFC document 2617. At 622, the UE 602 may calculate an authentication response. The UE may send the authentication request to BSF 604 at 624. As illustrated at 626, the authentication request may include the private identity information, the realm, the nonce, a cnonce, the qop value, a nonce count, an authentication algorithm, a digest uri, and the opaque. In an example embodiment, the cnonce, the nonce count, and/or the digest uri may be illustrated, by the IETF, in RFC document 2617. At 628, the BSF 604 may calculate a response and compare the values received from the UE 602 with the calculated values at the BSF 604. At 630, the BSF 604 may send a message (e.g., a 200 OK message) to the UE 602 that confirms to the UE 602 that authentication was successful. The message at 630 may include a binding trusted identifier (B_TID) and/or a key Ks lifetime, as illustrated at 632. In an example embodiment, the B_TID and the Ks lifetime may be illustrated, in 3GPP TS number 33.220. At 634, the UE 602 and the BSF 604 may calculate the Ks_NAF.

Another example embodiment may include a binding between the TLS outer authentication and the authentication established by the GBA mechanism a described herein. The proposed binding solution may be formulated by, for example, the UE 602 adding a binding response B$_{res}$ to the message at 624. B$_{res}$ may depend on the secure channel in a way that is known to BSF 604 and UE 602, but not an MitM. B$_{re}$, may be derived from secure channel messages in a similar (or even the same) way as the inner authentication (e.g., AKA) response, but it may be independent of the response. For example, the B$_{re}$, may not be derived from a response in a common, publicly known way, otherwise an MitM may be able to derive the B$_{re}$, in a similar manner. If an MitM is present, BSF 604 may perform verification of B$_{re}$, using parameters from the secure channel BSF 604-MitM which differ from those of the secure channel UE 602-MitM. A precondition for this may include a uniqueness of the secure channel which may be satisfied by protocols, such as TLS for example, where both BSF 604 and UE 602 may be able to introduce their own chosen parameters (e.g., nonces) in the channel establishment. Verification and/or recalculation of B$_{re}$, may fail if performed by an MitM, because the MitM may not know how to derive an acceptable B$_{res}$ value, while recalculation of the GBA response by the MitM may succeed. In this way, the MitM may be detected.

In an example embodiment, the UE 602 may take the TLS encryption key and hash it using a keyed hash function H where the key depends on the AKA authentication challenge. This may be posed by the BSF 604 in the message at 618. For example, the AV may be formatted properly and fed directly into the GBA response calculation algorithm in place of an AKA challenge value. This may mitigate replay and may bind the secure TLS channel 608 to the GBA authentication run.

According to an example embodiment, a binding of the secure channel 608 to the challenge-response authentication 618-630 may be established. For example, the UE 602 may, after having received the authentication challenge 620 (e.g., the inner_auth_challenge), apply a digest algorithm H (e.g., an HMAC algorithm) with a TLS_key extracted from the TLS channel at 608 to obtain a modified challenge*. This may be represented as H(TLS_key, inner_auth_challenge)->challenge*, for example. An example embodiment of a key extraction method for TLS is illustrated, by the IETF, in RFC document 5705. The UE 608 may calculate the response to the challenge posed by BSF 604 at 622, and concurrently calculate a binding response B$_{res}$ using the same, or similar algorighm. This may be represented as AKA-RESPONSE (inner_auth_challenge)->response; AKA-RESPONSE (challenge*, IK)->B$_{res}$, for example. The UE may send both the response and B$_{res}$ back to BSF 604 at 624.

BSF 604 may obtain assurance of the binding by way of checking the UE 602 response. If the response is confirmed, BSF 604 knows the entity at the other end of the communication is authenticated. If B$_{res}$ is also confirmed, where BSF 604 uses its own end's TLS key for verification, the authenticated entity may also be the one having the TLS tunnel with BSF 604, otherwise a MitM may be suspected.

Figure 7:
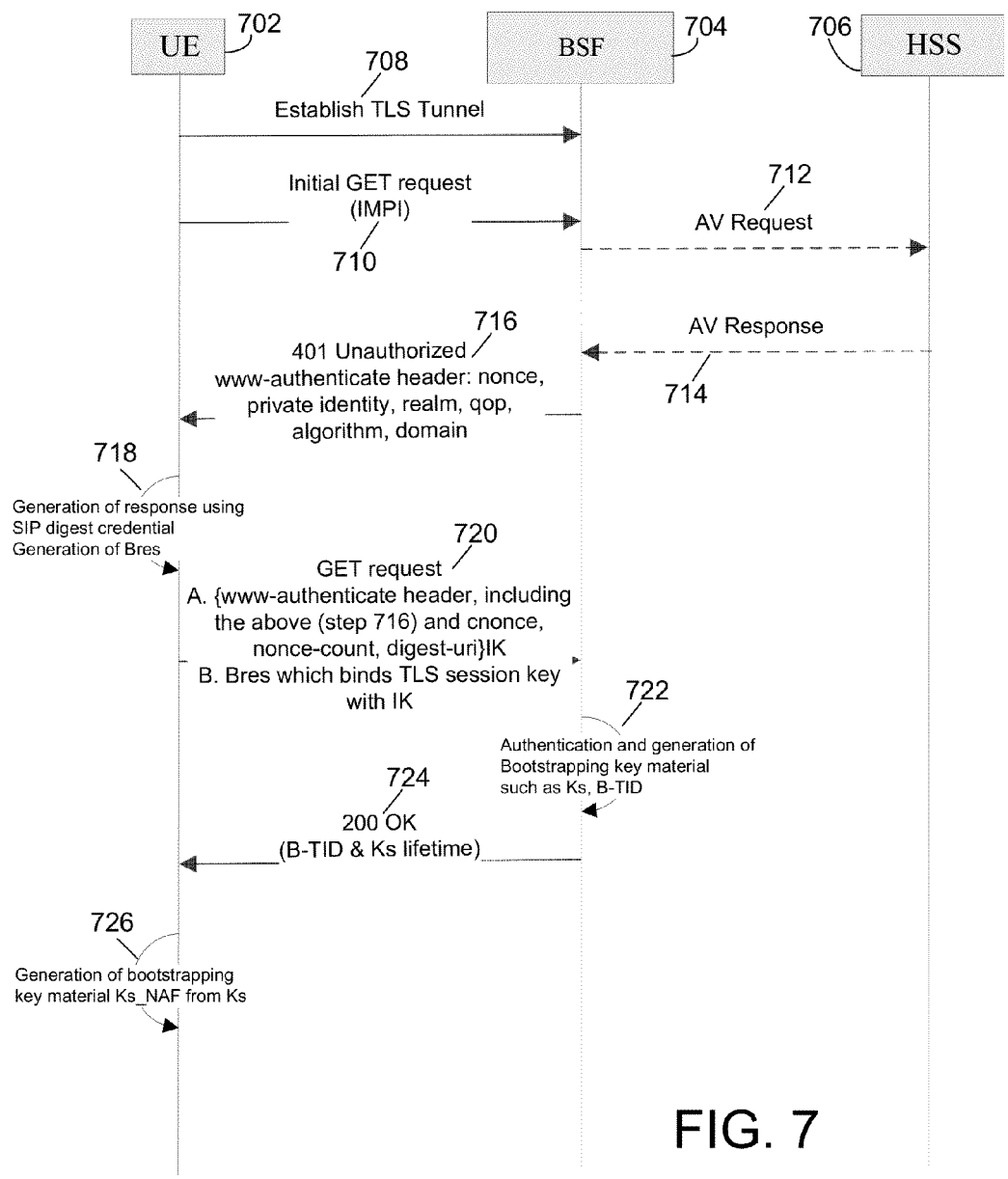
FIG. 7 is an example message flow diagram for binding Transport-Layer Security (TLS) and GBA with Session Initiation Protocol Digest (SIP-Digest) authentication.

FIG. 7 is a diagram of an example call flow binding TLS and GBA with SIP-Digest authentication. As illustrated in FIG. 7, the UE 702 may start the bootstrapping procedure by initiating a TLS session with the BSF 704. The UE 702 may authenticate the BSF 704 by the certificate presented by the BSF 704. The BSF 704 may not require authentication from the UE 702 at this point. Following the establishment of the TLS tunnel at 708, the UE 702 may send a request message (e.g., an HTTP GET request) at 710 that includes a private identifier (e.g., IP multimedia subsystem private identifier (IMPI)) to the BSF 704. The BSF 704 may request authentication information (e.g., AV(s)) from the HSS 706 at 712. At 714, the HSS 706 may provide the requested data (e.g., including the AV(s)) to the BSF 704. The BSF 704 may send to the UE 702 an authentication challenge (e.g., in an HTTP 401 unauthorized response) at 716. The authentication challenge may include an authentication header and/or a randomly generated nonce. In addition to the nonce, the authentication header may include additional parameters such as a private identity, a realm, a qop value, algorithm information, and/or a domain.

When responding to a challenge from the BSF 704, as indicated at 718, the UE 702 may generate a random cnonce, and calculate the authentication response by using SIP Digest credentials. The UE 702 may also generate a messages authentication code (MAC) value $B_{res}$, using both the TLS tunnel session key and a session key for example. The TLS tunnel session key and/or the session key may include the integrity key (IK) or the confidentiality key (CK) for example. In an example embodiment, the IK may be used instead of the CK, as the IK may be designated to be used for integrity protection purposes. These keys may be generated from the authentication challenge RAND taken from the AV the UE 702 has received. This may bind the TLS tunnel authentication with the GBA protocol. Both the authentication challenge response, and $B_{res}$, may be put into the authorization header and sent back to the BSF 704 in a request message (e.g., an HTTP GET request message) at 720. $B_{res}$ may be calculated by the same algorithm as the authentication response, however it may be calculated with different input parameters as described.

The BSF 704 may check $B_{res}$ against its own expected value, $B_{res}*$. It may do so because it knows both the keys used in the calculation of $B_{res}$ and the expected authentication response. If the received $B_{res}$ matches $B_{res}*$, and the received authentication response matches its expected value, the BSF 704 may determine that the UE 702 is authentic and also may assure itself that, because of the binding effect verified from the matching of the two comparisons, the UE 702 that it authenticated in the formation of the TLS tunnel is the same UE 702 that it authenticated in the GBA aspect of the protocol. The BSF 704 may generate bootstrapping key material, such as the key lifetime of the GBA/GAA master session key Ks and B-TID at 722. At 724, BSF 704 may send to the UE 702 a message (e.g., a 200 OK message) including the B-TID and the key Ks. The UE 702 and/or the BSF 704 may derive bootstrapping key material Ks_NAF using Ks. For example, at 726 the UE 702 may generate Ks_NAF from Ks. Ks_NAF may be used to secure the Ua reference point.

The application specific key for security over the Ua reference point (between UE 702 and network authentication function (NAF) (not shown)) may be derived, at least in part, from a bootstrapped key via GBA. For example, Ks_NAF may be derived from Ks=CK||IK, where CK and IK are part of the AV delivered from the HSS 706 to the BSF 704 at 714. The binding may still be effective if Ks_NAF is derived from both Ks and the master key established during the formation of the TLS tunnel. Thus Ks_NAF may be shared between the UE 702 and the network. It may not be available to any MitM.

The embodiments described herein may be implemented in a cloud computing scenario. According to an example embodiment, traits and/or technical features of the local OpenID may be combined to enable multi-tenant capable cloud access from one or more private devices. For example, local OP authentication, RP authentication, secret establishment, and/or enrollment procedures may be combined. At least two aspects of outsourcing for computing resources of an organization may be combined as described herein. In one example aspect, the modern workforce class of remote, external, mobile, and field workers may encourage an organization to make use of workers' private devices for work purposes. In another example aspect, information and computing resources may be increasingly outsourced to computer clouds (e.g., multi-tenant hosting infrastructures and/or servers). The outsourcing organization's security requirements in this dual outsourcing scenario may set constraints on the security architecture chosen for its implementation. These may be described in terms of protection goals and/or security controls which may be used to protect the organization's assets for example.

The user device may be considered insecure. Even if full protection of the corporate data may not be possible on a device, the organization's data may at least be secured in the cloud storage, such as to prevent data loss and/or leakage through user devices, to the extent possible. One way to do this may be to allow access to the cloud via a remote desktop application, which may connect to a virtual workstation in the cloud for example. As a benefit, this may allow remote workers and/or the virtual workstation to use a different operating system (OS). For example, the user device may be a tablet running an ANDROID™ or APPLE® OS, and may connect to a MICROSOFT WINDOWS® virtual machine, such as via some remote desktop protocol (RDP) client application for example. User authentication may be secured by hardware protection measures at the user's end, which may be bound to a smart card or other trusted environment for example. As described herein a smart card or other trusted environment may be issued that is enabled with local OpenID to the user(s) of the user equipment. User accounts may be enrolled for use in the smart card or other secure environment embodiments described herein.

The cloud host may provide some security controls and/or contractual guarantees. The organization using the cloud service may establish further, independent security control against data loss and/or leakage in such a multi-tenant environment. As an example, the organization's IT department may install a disk encryption solution for the (virtual) hard drives of the cloud workstations.

The protection offered by a disk encryption on cloud computers may be limited. The cloud host's hypervisor may have full data access while the virtual workstation is in operation. The cloud host's hypervisor may listen to the sent credentials used to decrypt the hard drive, when a user logs on to the workstation. The disk encryption may be bound in some way to the hosting hardware, such as by using Trusted Computing based virtualization support technology for example.

The remote user device may submit secret data, such as a disk encryption credential (e.g., a password) for example, to the virtual machine in the cloud. Such data may be protected to reach its destination secretly, and it may not be known to the user. This credential may be secretly stored on the smart card or other trusted environment enabled with local OpenID in such a way that it is transferred to the designated virtual machine.

Figure 8:
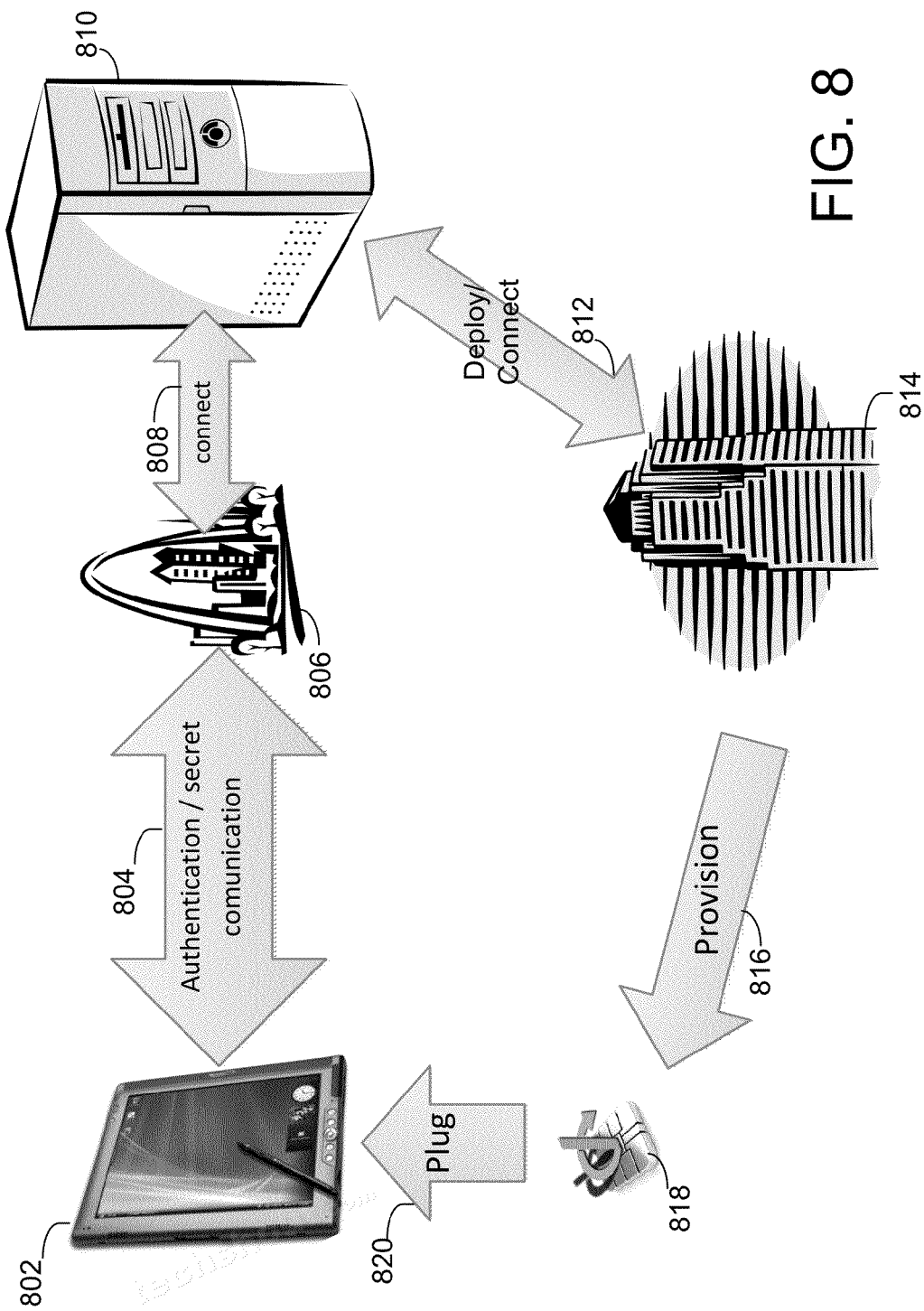
FIG. 8 illustrates a diagram of an example communications system that implements a local authentication entity/identity provider and cloud/remote computing services.

FIG. 8 illustrates a diagram of an example communications system that implements a local authentication entity and cloud/remote computing services. As illustrated in FIG. 8, at 816 a corporate user may obtain a smart card 818, or other trusted environment for example, from the company 814. The smart card may be a local OpenID-enabled smart card. The smart card 818 may include an $OP_{loc}$ for example. The smart card 818 may include a credential vault for private access to the company 814 resources hosted elsewhere, such as in the cloud-hosted virtual machine (VM) 810. At 812 the company 814 may connect to the cloud-hosted VM 810 and store/ upload company 814 information, services, documents, and/or the like for access by a user device 802 via smart card 818.

The user may insert the smart card 818 (e.g., a smart card that is enabled with local OpenID technology to perform $OP_{loc}$ functions) into the user device 802 at 820. The user device 802 may be a tablet, smartphone, mobile phone, laptop computer, or other mobile device for example. The user device 802 is not required to be a mobile device, but may be any other computing device configured to access services on the cloud-hosted VM 810 using the smart card 818 or other trusted environment. Some applications may be installed on the user device 802, which may include a remote desktop protocol (RDP) client to access the remote desktop on the cloud-hosted VM 810 for example. The login to the remote desktop may be mediated through a web-based gateway 806, which may act as an RP for the smart card authentication (e.g., OpenID authentication) procedure. This RP 806 may reside in the cloud-hosted VM 810 or may be an independent entity. The RP 806 may be offered as a security service to outsourcing companies, or it may be operated by the company 814 itself. The gateway RP 806 may have a secure, private connection at 808 to the cloud-hosted VM 810.

The local OpenID-based log-on may combine one or more of at least three security features described herein. For example, the local OpenID-based log-on may include: (1) authentication of a user via $OP_{loc}$; (2) authentication of the RP 806 (e.g., the security gateway) to the $OP_{loc}$ on the smart card 818; and/or (3) establishment of a private secret, end-to-end between smart card 818 and RP 806, and optionally delegated further to the cloud-hosted VM 810. Authentication of the user via the $OP_{loc}$ on the smart card 818 may include (at least) two-factor authentication by way of possession of the smart card 818 and knowledge of an authentication secret, and biometric user authentication. The authentication and/or secret communication may be performed via a secure communication between user device 802 and RP 806 at 804. Authentication of the RP 806 to the $OP_{loc}$ on the smart card 818 may extend to the user to ensure the user connects to the designated corporate resource and not to a spoofed site. For example, the credentials for RP 806 authentication may be included securely in the smart card 818. The RP 806 may delegate the secret with the user device 802 to the cloud-hosted VM 810, or act as a middle point of two secure channels for example.

When the secret is established between the $OP_{loc}$ on the smart card 818 and RP 806, the credential vault on the smart card 818 may be unlocked. The credentials for data access on the cloud-hosted VM 810 may be encrypted with the established secret (e.g., on card) and/or submitted to the cloud-hosted VM 810. There, the credential may be decrypted and verified and, if the verification is successful, the secret may be used to decrypt user data. The user may work on the cloud-hosted VM 810 via the remote desktop application. The user may have access to corporate resources via a secure connection from the cloud-hosted VM 810 to the corporate Intranet for example.

Figure 9:
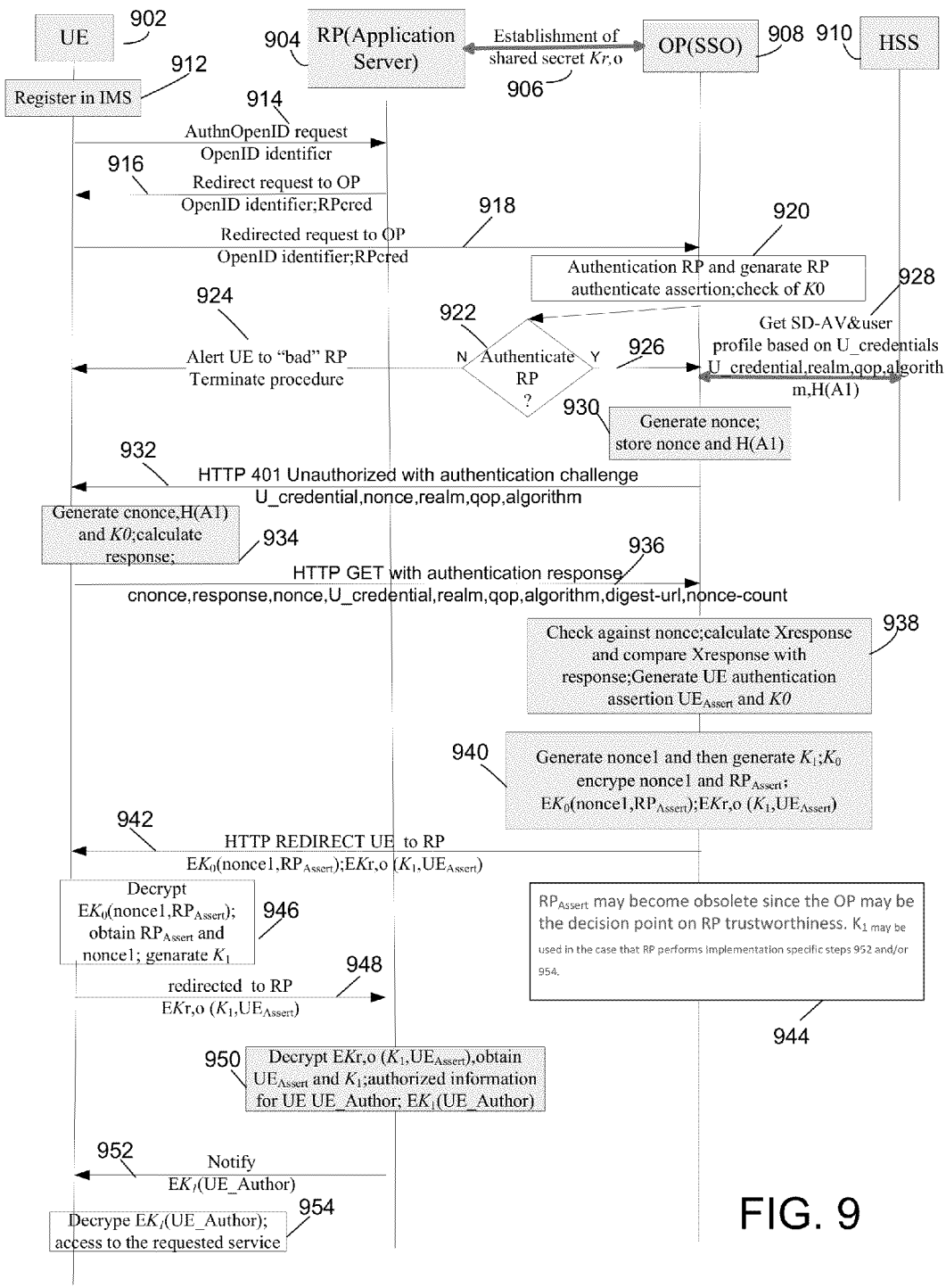
FIG. 9 illustrates an example message flow diagram that uses SIP-Digest authentication and includes service provider authentication.

FIG. 9 illustrates an example protocol flow that uses SIP Digest authentication and includes RP 904 authentication in OpenID. The authentication may include authentication of a UE 902 toward the OP 908 using a pre-shared key $K_{r,o}$ between the RP 904 and the OP 908. The RP authentication in the OpenID authentication may, in turn, be bootstrapped from SIP Digest authentication. The protocol flow illustrated in FIG. 9 includes communications between UE 902, RP 904 (e.g., Application Server), OP 908 (e.g., Single-Sign-on (SSO) Server), and HSS 910. RP 904 and OP 908 may have pre-established a shared secret $K_{r,o}$ at 906 that is used for secure communication between the entities.

In the protocol illustrated in FIG. 9, OpenID may be used in its stateless mode for UE 902 authentication. A combination of steps 912 to 918 may be used to achieve RP 904 authentication at the OP 908. At 912, UE 902 may register in an internet protocol (IP) multimedia subsystem (IMS). The UE 902 may send an authentication request (e.g., OpenID authentication request) to the RP 904 at 914. The authentication request may include an authentication identifier (e.g., OID). RP 904 may send a redirect request to UE 902 at 916. The redirect request at 916 may redirect the UE 902 to the OP 908. The redirect request may include the authentication identifier (e.g., OID) and/or the RP credential $RP_{Cred}$ that corresponds to RP 904. The $RP_{Cred}$ may be signed with the pre-shared key $K_{r,o}$ that is shared with OP 908. At 918, UE 902 may send a redirect request message to OP 908. The redirect request message may include the authentication identifier (e.g., OID) and/or the RP credential $RP_{Cred}$ received from RP 904 at 916.

At 920, OP 908 may perform authentication of RP 904 using the $RP_{Cred}$ and/or generate an RP authentication assertion. OP 908 may also perform a check of shared key $K_0$, which may be a shared key between UE 902 and OP 908, to ensure secure communications between UE 902 and OP 908. At 922, OP 908 may determine whether RP 904 has been authenticated. If RP 904 is not properly authenticated at 922, OP 908 may send an alert to UE 902 at 924 indicating that RP 904 is a bad RP and to terminate the procedure. If RP 904 is properly authenticated at 922, then OP 908 may continue with the protocol. In an example embodiment, the generation of the RP 904 authentication assertion at 920 may occur if the RP 904 is determined to be authentic at 926. In an example embodiment (not illustrated in FIG. 9), if the RP 904 authentication decision at 922 is considered as the point in which OP 908 makes the decision on RP authentication, then $RP_{Assert}$ usage may be omitted from the protocol in the steps following the RP 904 authentication decision.

In an example variant, $RP_{Cred}$ may be a plain text identifier of the RP 904 (i.e., not signed with any key), which may allow OP 908 to select the correct shared key $K_{r,o}$ for further use. In this case, if $RP_{Cred}$ does not correspond to any RP known by the OP 908, the OP 908 may decide to terminate procedure and notify UE 902.

Continuing with the example message flow illustrated in FIG. 9, SIP-Digest authentication may be performed. For example, OP 908 may obtain an SIP digest authentication vector (SD-AV) and/or user profile information from HSS 910 at 928. The OP 908 may obtain such information based on user credentials (e.g., username/password). The OP 908 may also obtain user credentials, a realm, a qop value, an authentication algorithm, and/or a hash H(A1) from HSS 910. In an example embodiment, the realm, qop value, authentication algorithm, and/or has H(A1) may be illustrated, by the IETF, in RFC documents 2069 and 2617.

At 930, OP 908 may generate a nonce and store the nonce and H(A1). OP 908 may send an authentication challenge (e.g., an HTTP 401 unauthorized message with an authentication challenge) to the UE 902 at 932. The authentication challenge may include the user credentials, the nonce, the realm, the qop value, and/or the authentication algorithm. At 934, UE 902 may generate a cnonce, H(A1), and/or secret key $K_0$ shared with OP 908 for secure communications. UE 902 may also calculate a challenge response and send the challenge response (e.g., an HTTP GET message with authentication response) at 936 to OP 908. The challenge response may include the cnonce, the response, the nonce, the user credentials, the realm, the qop value, the authentication algorithm, a digest-url, and/or a nonce-count. In an example embodiment, the cnonce, the nonce, the realm, the qop value, the authentication algorithm, the digest-url, and/or the nonce-count may be illustrated, by the IETF, in RFC document 2617. The shared key $K_0$ may be derived from the authentication response which may bind the shared key $K_0$ to the SIP Digest authentication. At 938, the OP 908 may check against the nonce, calculate an Xresponse, and/or compare the Xresponse with the response received from UE 902.

If the SIP Digest authentication succeeds (e.g., the Xresponse, or certain parameters therein, match the response, or certain parameters therein), OP 908 may generate a UE authentication assertion $UE_{Assert}$ and/or shared key $K_0$ at 938. At 940, OP 908 may generate a nonce1 and/or $K_1$, which may be a shared key between UE 902, OP 908, and/or RP 904 that is used to establish a secure channel between the UE 902 and the RP 904. $K_1$ may be generated by the OP 908 using nonce1 in the generation for freshness. $K_0$ may be used to encrypt nonce 1 and/or the RP authentication assertion message $RP_{Assert}$, which may be referred to as $EK_0(nonce1, RP_{Assert})$ for example. Encryption with $K_0$ may enable the rightful, authenticated UE 902 to obtain $RP_{Assert}$, which may be a confirmation to the UE 902 that it is communicating with the intended, authentic RP 904. The OP 908 may use shared key $K_{r,o}$ to encrypt key $K_1$ and/or UE authentication assertion message $UE_{Assert}$, which may be referred to as $EK_{r,o}(K_1, UE_{Assert})$ for example. At 942, OP 908 may send a redirect message to UE 902, which may redirect UE 902 to RP 904. The redirect message may include $EK_0$ (nonce1, $RP_{Assert}$) and/or $EK_{r,o}(K_1, UE_{Assert})$. In an example embodiment, the RP authentication assertion message $RP_{Assert}$ may become obsolete at a certain point in the protocol flow, as illustrated at 944, as the OP 908 may be the decision point on RP 904 trustworthiness. $K_1$ may be used when RP 904 performs communications with UE 902, such as performing implementation specific steps 952 and/or 954 for example, to ensure that UE 902 is communicating securely with the intended RP 904.

At 946, UE 902 may decrypt the nonce1 and/or RP authentication assertion message $RP_{Assert}$ using $K_0$. By being able to decrypt the RP authentication assertion $RP_{Assert}$ using $K_0$, the UE 902 may confirm that it is communicating with the intended, authentic RP 904. UE 902 may obtain the RP authentication assertion message $RP_{Assert}$ and nonce 1. The UE 902 may authenticate the RP 904 based on the received RP authentication assertion $RP_{Assert}$. UE 902 may generate $K_1$ using nonce1. Encryption with shared key $K_1$ may enable the rightful, authenticated UE 902 to obtain $UE_{Author}$, which may serve as an access token for use with services. UE 902 may be redirected to RP 904 at 948. At 948, UE 902 may send key $K_1$ and the UE authentication assertion message $UE_{Assert}$ to RP 904. The key $K_1$ and $UE_{Assert}$ may be encrypted with shared key $K_{r,o}$, which may be referred to as $EK_{r,o}(K_1, UE_{Assert})$ for example. This encryption may have been performed previously by the OP 908. At 950, RP 904 may decrypt $EK_{r,o}(K_1, UE_{Assert})$ using $K_{r,o}$ and obtain $UE_{Assert}$ and $K_1$. Information for UE 902 may be authorized at 950. For example, RP 904 may use $K_1$ to verify the signature of $UE_{Assert}$. After successfully verifying $UE_{Assert}$, RP 904 may generate authorization information $UE_{Author}$, which may be encrypted with key $K_1$ and referred to as $EK_1(UE_{Author})$ for example. $UE_{Author}$ may include authorization information or an authorization parameter that indicates that the UE 902 is authorized to access one or more services at the RP 904. RP 904 may notify UE 902 at 952 as to whether UE 902 is authorized for services at RP 904. For example, RP 904 may send the UE authorization parameter or information $UE_{Author}$. $UE_{Author}$ may be encrypted with secret key $K_1$ ($EK_1(UE_{Author})$) shared between UE 902 and RP 904. At 954, UE 902 may decrypt $EK_1(UE_{Author})$ and may access the requested service from the RP 904 using the $UE_{Author}$. Steps 952 and/or 954 may be implementation specific steps, which may be optional and may depend on the service implementation of UE 902 and/or RP 904. For example, these may be specific to the desired application of providing UE 902 with generic service access after authentication. If these steps are not used, then $K_1$ may not be needed.

In an example embodiment, the protocol flow illustrated in FIG. 9 may use the secret $K_{r,o}$ to achieve RP 904 authentication toward OP 908. For example, the secret $K_{r,o}$ may be used for authentication if it is not used to sign the message with the $RP_{Cred}$ (e.g., in the steps 912 to 918) towards the OP 908. For example, if the OP 908 and the RP 904 already share the secret $K_{r,o}$, this secret may be used for RP 904 authentication with the OP 908. The discovery and (optional) association creation steps of the authentication protocol (e.g., OpenID protocol) are not shown in the protocol illustrated in FIG. 9. The implementation on the UE 902 may not be affected by any such RP 904 authentication. For example, in one embodiment, the UE 902 may not include $OP_{loc}$ functionality and, therefore, may not be able to send the challenge $RP_{Chv}$ to the RP.

Figure 10:
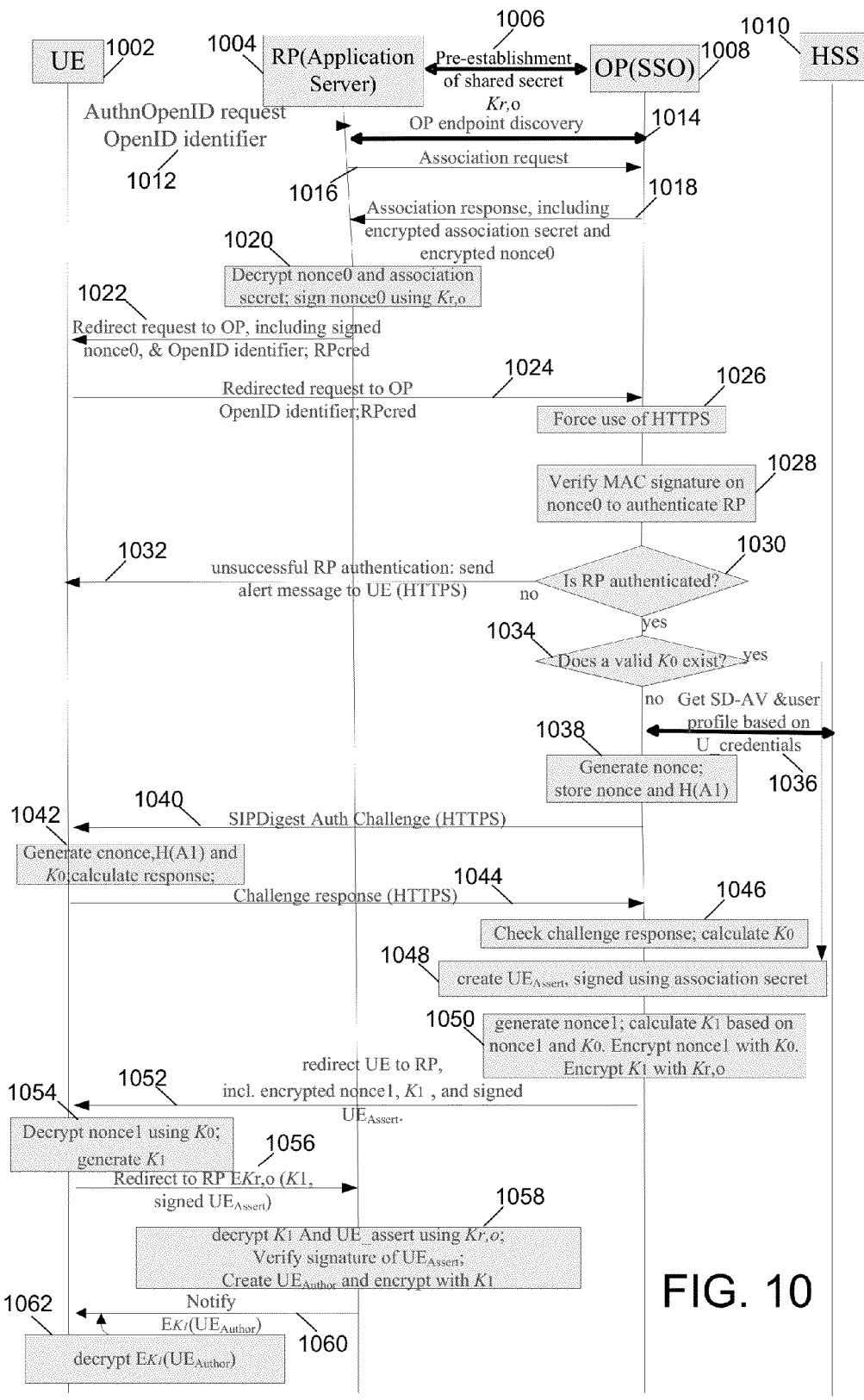
FIG. 10 illustrates an example message flow diagram of an example protocol with service provider authentication toward the identity provider.

FIG. 10 illustrates a message flow diagram of an example protocol with RP 1004 authentication toward the OP 1008. In FIG. 10, communications may be performed between a UE 1002, RP 1004 (e.g., Application Server), OP 1008 (e.g., SSO server), and/or HSS 1010. RP 1004 and OP 1008 may have a pre-established shared secret, illustrated at 1006, for enabling secure communications via a secure channel.

As illustrated in FIG. 10, the UE 1002 may issue an authentication request (e.g., an OpenID authentication request) to the RP 1004 at 1012 which includes a login identifier (e.g., OpenID identifier such as a URL or an email address). The RP 1004 may discover the OP 1008 at 1014. At 1016, the RP 1004 may send an association request (e.g., OpenID association request) to the OP 1008. The RP 1004 and the OP 1008 may establish a Diffie-Hellman Key D-H. OP 1008 may generate an association secret and/or an association handle, which may together be called association. At 1018, the OP 1008 may send RP 1004 an association response, which may include the association secret and a nonce0. The association secret and/or the nonce0 may be encrypted with the established D-H key. The RP 1004 may decrypt the received encrypted nonce0 and encrypted association secret at 1020. The RP 1004 may then sign nonce0 with shared key $K_{r,o}$, which may be the pre-established key shared between RP 1004 and OP 1008. HMAC or another suitable symmetrical signature algorithm may be used to sign nonce0. The RP 1004 and the OP 1008 may have a shared secret $K_{r,o}$ using a known mechanism, for example, using the Diffie-Hellman Key Exchange protocol or pre-shared secret. With this shared secret, the OP 1008 and the RP 1004 may sign messages and verify each other's messages that have been signed with the shared secret $K_{r,o}$.

At 1022, the RP 1004 may redirect the authentication request sent by the UE 1002 using a redirect message. The redirect message may include the login identifier (e.g., OpenID identifier), the RP 1004 identifier ($RP_{Cred}$), and/or the signed nonce0. For example, the UE 1002 may be redirected to the OP 1008. The authentication request may be redirected to the OP 1008 at 1024. The redirection may include the login identifier (e.g., OpenID identifier) and/or $RP_{Cred}$. The OP 1006 may enforce the use of HTTPS for communication with UE 1002 at 1026 for secure communications. Enforcement of the use of HTTPS may be performed by configuration of the OP 1002's web server (e.g., address rewrite). At 1028, the OP 1008 may verify the signature of nonce0 to authenticate the RP 1004. For example, the OP 1008 may verify the signature using shared key $K_{r,o}$. The RP 1004 authentication of step 1028 may be determined at 1030, and if it fails, the OP 1008 may send an alert message to the UE 1002 at 1032, which may be protected by HTTPS for example, to indicate RP 1004 authentication failure. If RP 1004 authentication at step 1028 succeeds, the protocol flow may proceed, such as at step 1034 for example.

At 1034, the OP 1008 may determine if a secure channel has been established between the OP 1008 and the UE 1002. For example, the OP 1008 may determine if a valid key $K_0$ exists. If the valid key $K_0$ does exist, the protocol flow may proceed to step 1048 with the generation of UE authentication assertion $UE_{Assert}$. If a valid key $K_0$ does not exist, the protocol flow may proceed to perform authentication of UE 1002. In an example embodiment, the establishment of the secure channel (e.g., as illustrated in FIG. 4) and the authentication of the UE 1002 may be bound together in the same protocol flow. As illustrated at 1036 the OP 1008 may send an authentication request to the Home Subscription Server (HSS) 1010, and may obtain the SIP Digest authentication vector (SD-AV) and/or the user profile based on the user credential from the HSS 1010. The SD-AV may include a qop value, an authentication algorithm, a realm, and a hash, called H(A1), of the user credential, realm, and password. In a multiple HSS environment, the OP 1008 may obtain the address of the HSS 1010 where the details of the UE 1002's subscription are stored by querying the Service Layer Function (SLF). At 1038, the OP 1008 may generate a random nonce, and may store the hash H(A1) and the nonce against the user credentials. The OP 1008 may send (e.g., in a protected HTTPS message) an authentication challenge message (e.g., a 401 authentication challenge as an SIP-Digest authentication challenge) at 1040 to the UE 1002 which may include the nonce, the realm, the qop value, the authentication algorithm, and/or the user credential.

Upon receiving the challenge at 1040, the UE 1002 may generate a random cnonce and the H(A1) at 1042. The UE 1002 may generate the shared secret $K_0$ based on the H(A1), the cnonce, and/or other information, such as the material included in the authentication challenge for example. The shared secret $K_0$ may be a shared secret between the UE 1002 and the OP 1008, which may enable communications between the UE 1002 and the OP 1008 to be transmitted using a secure channel. The UE 1002 may use the cnonce and/or other parameters provided in the authentication challenge, such as the nonce, the user credentials, and/or the qop value for example, to calculate an authentication response. At 1044, the UE 1002 may send a challenge response (e.g., which may be a protected HTTPS message) to the OP 1008. The challenge response may include the cnonce, the nonce, the response, the realm, the user credentials, the qop value, the authentication algorithm, the nonce-count, and/or the Digest-url for example. Upon receiving the response at 1044, the OP 1008 may use the previously stored nonce to check against the nonce included in the response. If the check is successful, the OP 1008 may calculate the expected response (Xresponse) using the previously stored hash H(A1) and the nonce together with other parameters included in the response (e.g., cnonce, nonce-count, qop value, etc.) and may use this to check against the response received from the UE 1002. If the check is successful, the authentication of the UE 1002 may be considered to have succeeded. If the check is unsuccessful, the authentication may be considered to have failed. If the UE 1002 is successfully authenticated, the OP 1008 may generate the shared secret $K_0$, which may be generated based on the hash H(A1), the cnonce, and/or other information, such as the material included in the authentication challenge for example. Alternatively, or additionally, upon receiving the response at 1044, the OP 1008 may create an authentication assertion $UE_{Assert}$. The $UE_{Assert}$ may be signed using the association secret, which may be the association secret used in the message at 1018 for example.

At 1050, the OP 1008 may generate a random nonce1 and/or may generate a shared secret $K_1$ based on $K_0$ and nonce1. The shared secret $K_1$ may be a shared secret between UE 1002, OP 1008, and/or RP 1004 for establishing a secure channel between the UE 1002 and the RP 1004. The OP 1008 may encrypt the nonce1 using $K_0$, which may be referred to as $EK_0(nonce1)$ for example, and may encrypt the $K_1$ and the signed assertion message $UE_{Assert}$ using $K_{r,o}$, which may be referred to as $EK_{r,o}(K_1, signed(UE_{Assert}))$ for example. The OP 1008 may send the UE 1002 a message (e.g., a redirect message) at 1052 which may include $EK_0(nonce1)$ and/or $EK_{r,o}(K_1, signed(UE_{Assert}))$ with redirection to RP 1004. At 1054, the UE 1002 may decrypt the $EK_0(nonce1)$ using shared key $K_0$ and may obtain the nonce1. The UE 1002 may generate the shared secret $K_1$ based on the $K_0$ and the nonce1. The message sent by the OP 1008 may be redirected to the RP 1004 at 1056. The message at 1056 may include $EK_{r,o}(K_1$, signed $UE_{Assert})$. The RP 1004 may decrypt the $EK_{r,o}(K_1$, signed $UE_{Assert})$, and obtain $UE_{Assert}$ and $K_1$ at 1058. RP 1004 may verify the signature of the assertion message $UE_{Assert}$ using the association secret shared with OP 1008. After verifying the assertion message $UE_{Assert}$, the RP 1004 may generate authorization information for the UE 1002. For example, the RP 1004 may generate authorization information $UE_{Author}$ and encrypt $UE_{Author}$ using $K_1$, which may be referred to as $EK_1(UE_{Author})$ for example. The RP 1004 may notify the UE 1002 at 1060 about the application-specific authorization information, which is included in this message, encrypted with $K_1$. The UE 1002 may decrypt the $EK_1(UE_{Author})$ at 1062 using shared key $K_1$ and may then access the requested service.

In FIG. 10, the authorization information or parameter $UE_{Author}$ may be specific to an application and/or specific to OP 1008. If the $UE_{Author}$ is specific to OP 1008, $UE_{Author}$ may be signed by $K_0$. If the authorization information or parameter $UE_{Author}$ is specific to an application, $UE_{Author}$ may be signed by either $K_{r,o}$ or signing key S. The transfer may work with signing key S.

In an example embodiment, the protocol flow illustrated in FIG. 10 may be implemented in using a split terminal scenario as described herein.

In another example embodiment, RP 1004 authentication may be included in a challenge-response step between OP 1008 and RP 1004, where the OP 1008 may send a challenge with a proof of freshness to the RP 1004 (e.g., via a nonce). The RP 1004 may use the pre-established shared secret $K_{r,o}$ to sign this nonce and return the answer to the OP 1008. The response to the authentication challenge may be as a direct response to the OP 1008 authentication challenge, or may be integrated in the redirect message, which sends the UE 1002 to the OP 1008. In either case, the OP 1008 may have reliable evidence on the authentication of the RP 1004 (e.g., before engaging in UE authentication). This may allow the OP 1008 to stop the protocol in the case of a failed RP 1004 authentication, and may save communication effort between UE 1002 and OP 1008 in the case of such a failed RP 1004 authentication. The OP 1008 may directly convey the information on the failed RP 1004 authentication to the UE 1002, as illustrated at 1032 for example.

As described herein, associations may be used for RP 1004 authentication. For example, if the RP 1004 establishes an association with the OP 1008, the corresponding steps may be modified to incorporate the challenge from the OP 1008. During the association establishment, the OP 1008 and RP 1004 may set up a MAC key which may be used to sign the authentication assertion message. This key may be sent encrypted using a temporary secret key which may be negotiated between OP 1008 and RP 1004, using Diffie-Hellman (DH) key for example. In addition to the temporary secret key, the OP 1008 may include a nonce, which may also be encrypted with the DH-key for example, in the response to the RP 1004.

The RP 1004 may decrypt the nonce and the MAC key based on the negotiated DH-key. The RP 1004 may use its own pre-established shared key $K_{r,o}$ to sign or encrypt the nonce as received from the OP 1008 and add it as an additional parameter to the redirect message which is sent to the UE 1002. Since the UE 1002 follows the redirect to the OP 1008, the OP 1008 may receive the signed or encrypted nonce, and may use the shared key $K_{r,o}$ to authenticate the RP 1004. In the case of a failed authentication, the OP 1008 may send an alert message to the UE 1002 to protect it from unauthenticated RPs. In the case of a successful RP 1004 authentication, the OP 1002 may proceed with the protocol.

Example embodiments are described for using a discovery mode for RP 1004 authentication. For example, the OP 1008 may be able to send information to the RP 1004, in the case where an association is not established between OP 1008 and RP 1004 (i.e., a stateless mode in OpenID). In the stateless mode, the information exchange between OP 1008 and RP 1004 may take place during discovery. However, the discovery may or may not involve the OP 1008, such as in the case of delegated discovery for example. In delegated discovery, the user identifier may be, for example, at http://myblog.blog.com, and then point to the OP endpoint URL at OP 1008 (e.g., at http://myblog.myopenid.com). Hence, the OP 1008 (e.g., at myopenid.com) may not be involved in the discovery directly and may not be able to authenticate the RP 1004 at this stage. The OP 1008 may be able to authenticate the RP 1004 during association at 1016, 1018, instead of determining authentication at 1028, 1030, as illustrated in FIG. 10 for example.

If the OP 1008 may be able to provide additional information during the discovery steps to the RP 1004 (i.e., the user identifier page is hosted at the OP 1008 itself), the OP 1008 may dynamically generate a nonce as part of the discovery information page and associate it with the identifier (e.g., URL or email address) of the HTTP requesting RP 1004. The OP 1008 may then expect the RP 1004 to sign or encrypt this nonce and include the information in the redirect message.

As illustrated herein, the OP 1008 may protect communications between the OP 1008 and the UE 1002. For example, as illustrated at 1026, the OP 1008 may force the use of HTTPS (i.e., the UE 1002 may be redirected to the use of HTTPS by the OP 1008 such that any subsequent communication between UE 1002 and OP 1008 may be protected). For example, TLS may be used. TLS may work by forcing the UE 1002 to automatically import the OP 1008's certificate, or to use a pre-installed OP certificate. Both may be checked against a root certificate (e.g., signed by a root CA) by the BA, for example. Such a protection may allow it to prevent MitM attacks on the authentication challenge message from OP 1008 to UE 1002 at 1040 for example. Also, in the case of a failed RP 1004 authentication, it may allow the OP 1008 to send an alert message to the UE 1002 in a protected manner.

Embodiments described herein may be implemented with a local assertion provider. Described herein are example protocols that reconcile RP authentication with OpenID and make use of the local assertion provider. The described embodiments may enable authentication of the RP when there is contact (e.g., the first contact) between the RP and the (network-side) OP, based on the pre-established shared secret $K_{r,o}$ between the RP and the OP. In the association mode of OpenID, this is the association phase.

Figure 11:
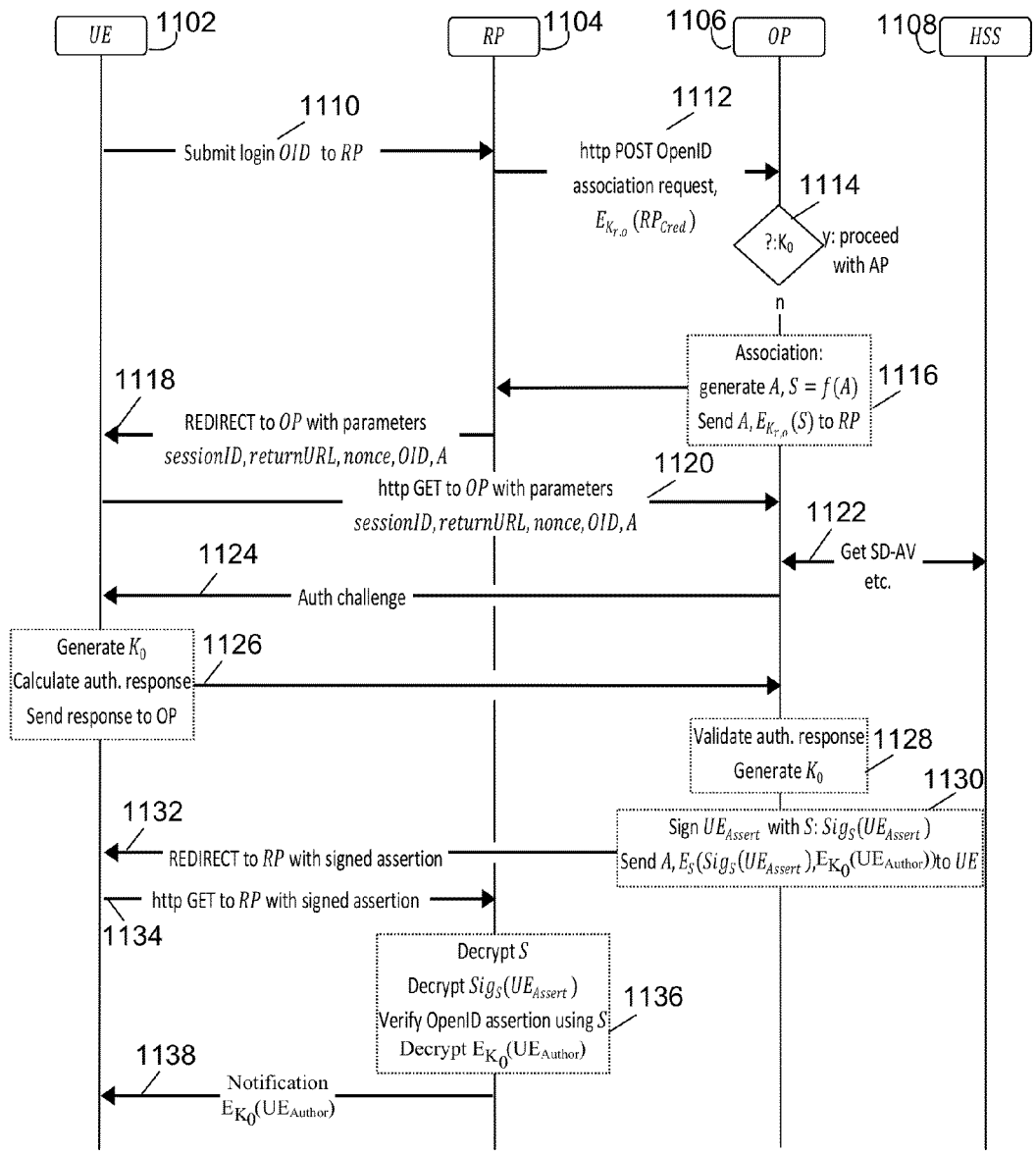
FIG. 11 illustrates an example message flow diagram of a provisioning phase with a local identity provider.

FIG. 11 illustrates an example embodiment of a message flow diagram of a provisioning phase with a local assertion provider. As illustrated in FIG. 11, a UE 1102, an RP 1104, an OP 1106, and/or an HSS 1108 may be implemented in communications performed in the provisioning phase with the local assertion provider. At various stages in the provisioning phase, nonces may be implemented for replay protection.

As shown in FIG. 11, UE 1102 may submit a login identifier (e.g., OID) at 1110 to RP 1104. RP 1104 may send an association request (e.g., an http POST OpenID association request) at 1112 to an OP 1106. The association request may include the RP 1104 credential $RP_{Cred}$, which may be encrypted with the shared key $K_{r,o}$ which is shared between RP 1104 and OP 1106. This encrypted $RP_{Cred}$ may be referred to as $EK_{r,o}(RP_{Cred})$ for example. The RP credential $RP_{Cred}$ may be a generic type of credential which may include be a pre-shared secret or an identifier. At 1114, OP 1106 may determine whether shared key $K_0$ exists. If shared key $K_0$ does exist, the OP 1106 may proceed with an authentication phase (AP). If the shared key $K_0$ does not exist, then the OP 1106 may proceed with the provisioning phase. For example, the OP 1106 may proceed to step 1116.

At 1116, the OP 1106 may perform association with RP 1104. For example, the OP 1106 may generate association handle A and/or signing key S. Signing key S may be generated from a function of association handle A. OP 1106 may encrypt signing key S with key $K_{r,o}$, which may be referred to as $EK_{r,o}(S)$ for example. OP 1106 may send association handle A and/or the encrypted signing key S to RP 1104. At 1118, the RP 1104 may send a message (e.g., redirect message) to UE 1102 that redirects the UE 1102 to the OP 1106. The message at 1118 may include parameters, such as the sessionID, the returnURL, a nonce, the login identifier (e.g., OID), and/or the association handle A. At 1120, the UE 1102 may send a message (e.g., an http GET request) to the OP 1106 that includes one or more of the parameters received from the RP 1104. For example, the message at 1120 may include the sessionID, the returnURL, the nonce, the login identifier (e.g., OID), and/or the association handle.

The OP 1106 may get the SIP digest authentication vectors (SD-AV) and/or other information from the HSS 1108 at 1122. The OP 1106 may send an authentication challenge to the UE 1102 at 1124. The UE 1102 may generate a shared key $K_0$ at 1126. UE 1102 may also calculate an authentication response and/or send the authentication response to the OP 1106 at 1126. For example, the authentication response may be calculated by the UE 1102 using pre-provisioned user credentials (e.g., username and password). At 1128, the OP 1106 may validate the authentication response, such as by comparing the received response with the expected response calculated from the authentication vectors SD-AV for example. Once the user/UE 1102 has been authenticated at the OP 1106, the OP 1106 may generate the shared secret $K_0$ which may be shared between the UE 1102 and the OP 1106. Encryption with $K_0$ may ensure that the rightful, authenticated UE 1102 obtains the $UE_{Author}$, which may be a service access token for later use with services. In an example embodiment, the $K_O$ may be a random number and may be generated using a cryptographic function.

At 1130, the OP 1106 may sign the authentication assertion message $UE_{Assert}$ indicating a successful authentication of the user/UE 1102. For example, the OP 1106 may use the signing key S to sign $UE_{Assert}$. The signed $UE_{Assert}$ may be referred to as $Sig_s(UE_{Assert})$. OP 1106 may send association handle A, the signed assertion $UE_{Assert}$, and/or the authorization message $UE_{Author}$ to UE 1102. The signed assertion $UE_{Assert}$ may be encrypted with signing key S, which may be referred to as $E_s$ ($Sig_s$ ($UE_{Assert}$)) for example. The authorization message $UE_{Author}$ may be encrypted with shared key $K_O$, which may be referred to as $EK_O(UE_{Author})$ for example. In an example embodiment, instead of both encrypting and signing the authentication assertion message $UE_{Assert}$, it may be sufficient to simply sign the authentication assertion message using signing key S. The association handle A, the $UE_{Assert}$, and/or the $UE_{Author}$ may be sent in a redirect message at 1132, which may redirect the UE 1102 to the RP 1104. At 1134, the UE 1102 may send a message (e.g., an http GET request) to the RP 1104, which may include the association handle, $E_s(Sig_s(UE_{Assert}))$, and/or $EK_O(UE_{Author})$. At 1136, the RP 1104 may decrypt signing key S, decrypt the signed assertion $Sig_s(UE_{Assert})$, verify the assertion (e.g., OpenID assertion) using S, and/or decrypt the encrypted authorization message $EK_O$ ($UE_{Author}$). The RP 1104 may send a notification to UE 1102 at 1138 that includes the $EK_O$ ($UE_{Author}$). The $EK_O$ ($UE_{Author}$) may indicate to the UE 1102 that the RP 1104 has been authenticated as the proper RP, and is not a rogue RP or other MitM, as the notification may include the $EK_O$ ($UE_{Author}$), which a rogue RP or other MitM would not be able to decrypt.

The RP authentication illustrated in FIG. 11 may be similarly implemented in other embodiments described herein. For example, the authentication implementations illustrated in FIG. 11 may be similarly implemented in the authentication phase illustrated in FIG. 2.

Figure 12:
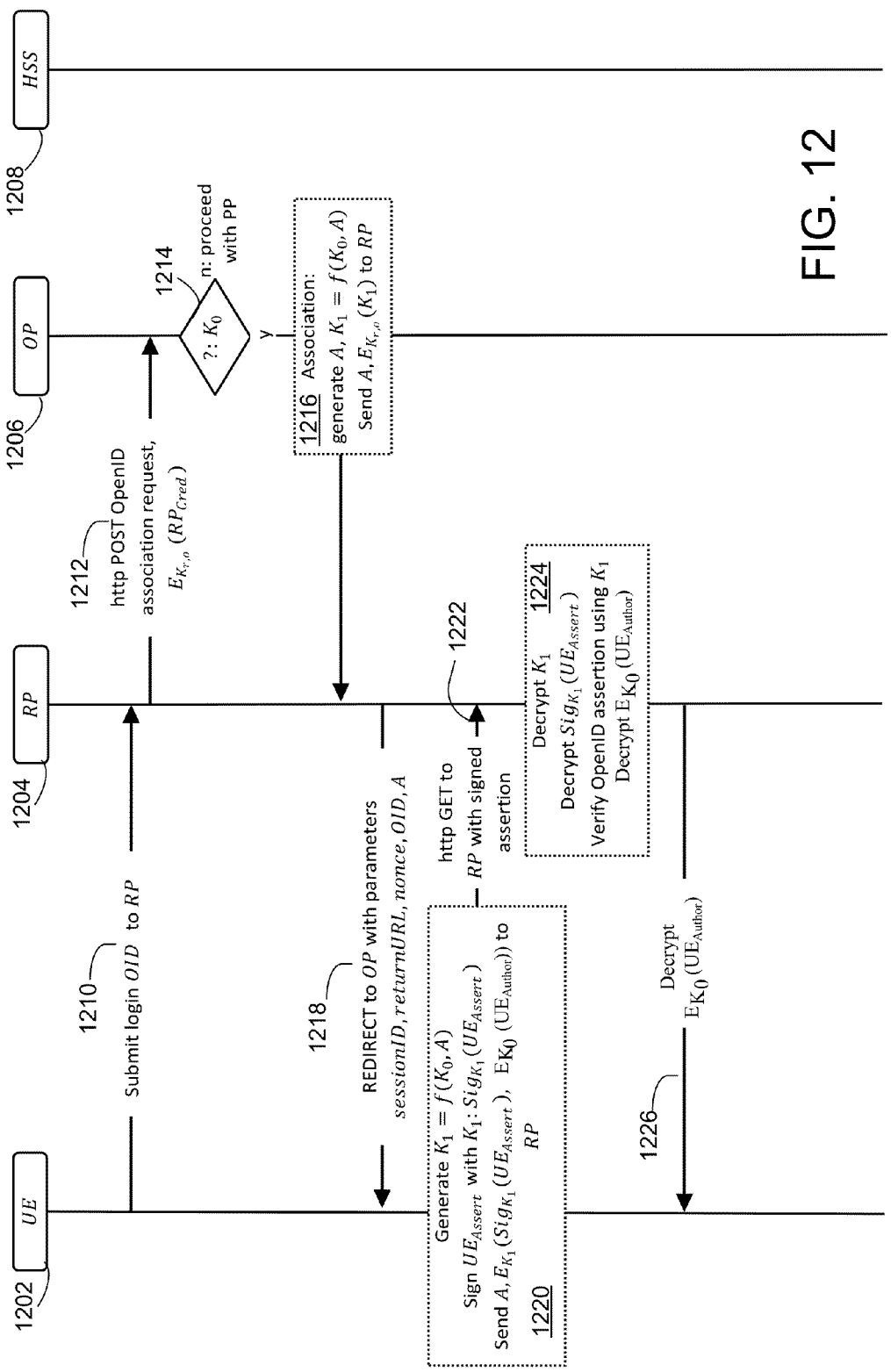
FIG. 12 illustrates an example message flow diagram of an example authentication phase with a local assertion provider.

FIG. 12 illustrates a message flow diagram of an example authentication phase with a local assertion provider according to embodiments described herein. As illustrated in FIG. 12, the authentication phase may include communications between UE 1202, RP 1204, OP 1206, and/or HSS 1208. In an example embodiment, UE 1202 may include local OP functionality $OP_{loc}$ for performing local authentication and signing of authentication assertions (e.g., OpenID authentication assertions), while OP 1206 may be an external OP, which may be located at the network for example. UE 1202 may send a login identifier (e.g. OID) to RP 1204 at 1210. At 1212, the RP 1204 may send an association request message (e.g., an http POST OpenID association request) to OP 1206. The association request message may include an RP credential $RP_{Cred}$ that corresponds to RP 1204. The $RP_{Cred}$ may be encrypted with a shared key $K_{r,o}$, which is shared between the RP 1204 and the OP 1206.

At 1214, OP 1206 may determine whether shared key $K_O$, which is shared between UE 1202 and OP 1206 for secure communications between these entities, has been provisioned. If shared key $K_O$ has not been provisioned, the protocol may proceed with a provisioning phase to provision shared key $K_O$. If shared key $K_O$ has been provisioned, the protocol may proceed with the authentication phase. In an example embodiment, the OP 1206 may not determine whether the shared key $K_O$ has been provisioned, and the protocol flow may continue without such determination.

At 1216, OP 1206 may perform association with RP 1204. For example, the OP 1206 may generate association handle A and/or shared key $K_1$. Shared key $K_1$ may be derived from a function of shared key $K_O$ and association handle A for example. Shared key $K_1$ may be encrypted with shared key $K_{r,o}$, which may be referred to as $EK_{r,o}(K_1)$ for example. Association handle A and encrypted key $K_1$ may be sent to RP 1204. RP 1204 may send a message at 1218 to UE 1202 that includes parameters, such as the sessionID, the returnURL, a nonce, the login identifier (e.g., OID), and/or the association handle A. The message at 1218 may be a redirect message that redirects that UE 1202 to the $OP_{10}$, on the UE 1202 (not shown) for authentication. At 1220, the UE 1202 may perform a local authentication. The UE 1202 may generate shared key $K_1$ at 1220 using a function of shared key $K_O$ and the association handle A. Encryption with $K_O$ may ensure that the rightful, authenticated UE 1202 obtains the $UE_{Author}$, which may be a service access token for later use with services. UE 1202 may sign the authentication assertion message $UE_{Assert}$ with shared key $K_1$, which may be referred to as $SigK_1$ ($UE_{Assert}$). UE 1202 may generate authorization information or parameter $UE_{Author}$ (e.g., using the local OP on the UE 1202). The UE 1202 may encrypt $UE_{Author}$ with shared key $K_O$, which may be referred to as $EK_O(UE_{Author})$ for example. UE 1202 may encrypt the $SigK_1(UE_{Assert})$ and/or the $EK_O(UE_{Author})$ with the shared key $K_1$, which may be referred to as $EK_1$ ($SigK_1(UE_{Assert})$, $EK_O(UE_{Author})$), and send the association handle A and $EK_1$ ($SigK_1(UE_{Assert})$, $EK_O(UE_{Author})$) to RP 1204. As illustrated at 1222, the UE 1202 may send a message (e.g., an http GET request) to the RP 1204 with the signed assertion $UE_{Assert}$.

RP 1204 may decrypt $K_1$ at 1224 using the shared key $K_{r,o}$. RP 1204 may decrypt $SigK_1(UE_{Assert})$ and may verify the authentication assertion message $UE_{Assert}$ using $K_1$. At 1224, RP 1204 may decrypt $EK_O$ ($UE_{Author}$) using $K_1$. RP 1204 may not be able to decrypt $UE_{Author}$, as $UE_{Author}$ may be encrypted by shared key $K_O$ shared between UE 1202 and OP 1206. At 1226, RP 1204 may send a notification to UE 1202 indicating that RP 1204 is the proper RP to which it has established a secure channel using $K_1$, and is not a rogue RP or other MitM, as the notification may include the information $EK_O$ ($UE_{Author}$), which a rogue RP or other MitM would not be able to decrypt.

Figure 13A:
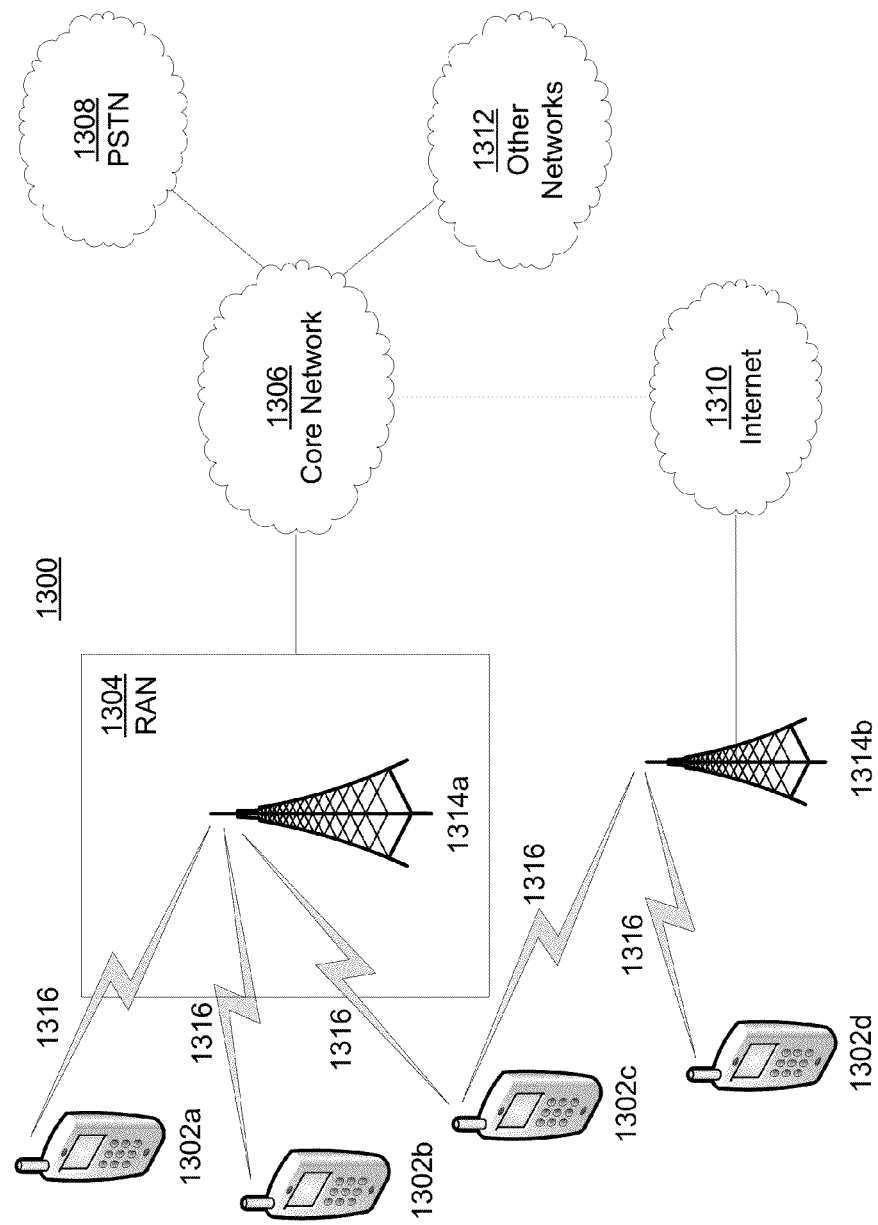
FIG. 13A is a system diagram of an example communications system in which one or more disclosed embodiments may be implemented.

FIGS. 13A-13E illustrate example network systems and devices which may be implemented in performing the embodiments described herein. FIG. 13A is a diagram of an example communications system 1300 in which one or more disclosed embodiments may be implemented. The communications system 1300 may be a multiple access system that provides content, such as voice, data, video, messaging, broadcast, etc., to multiple wireless users. The communications system 1300 may enable multiple wireless users to access such content through the sharing of system resources, including wireless bandwidth. For example, the communications systems 1300 may employ one or more channel access methods, such as code division multiple access (CDMA), time division multiple access (TDMA), frequency division multiple access (FDMA), orthogonal FDMA (OFDMA), single-carrier FDMA (SC-FDMA), and/or the like.

As shown in FIG. 13A, the communications system 1300 may include wireless transmit/receive units (WTRUs) 1302a, 1302b, 1302c, 1302d, a radio access network (RAN) 1304, a core network 1306, a public switched telephone network (PSTN) 1308, the Internet 1310, and other networks 1312, though it will be appreciated that the disclosed embodiments contemplate any number of WTRUs, base stations, networks, and/or network elements. Each of the WTRUs 1302a, 1302b, 1302c, 1302d may be any type of device configured to operate and/or communicate in a wireless environment. By way of example, the WTRUs 1302a, 1302b, 1302c, 1302d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 1300 may also include a base station 1314a and a base station 1314b. Each of the base stations 1314a, 1314b may be any type of device configured to wirelessly interface with at least one of the WTRUs 1302a, 1302b, 1302c, 1302d to facilitate access to one or more communication networks, such as the core network 1306, the Internet 1310, and/or the networks 1312. By way of example, the base stations 1314a, 1314b may be a base transceiver station (BTS), a Node-B, an eNode B, a Home Node B, a Home eNode B, a site controller, an access point (AP), a wireless router, and/or the like. While the base stations 1314a, 1314b are each depicted as a single element, it will be appreciated that the base stations 1314a, 1314b may include any number of interconnected base stations and/or network elements.

The base station 1314a may be part of the RAN 1304, which may also include other base stations and/or network elements (not shown), such as a base station controller (BSC), a radio network controller (RNC), relay nodes, etc. The base station 1314a and/or the base station 1314b may be configured to transmit and/or receive wireless signals within a particular geographic region, which may be referred to as a cell (not shown). The cell may further be divided into cell sectors. For example, the cell associated with the base station 1314a may be divided into three sectors. Thus, in one embodiment, the base station 1314a may include three transceivers, i.e., one for each sector of the cell. In another embodiment, the base station 1314a may employ multiple-input multiple output (MIMO) technology and, therefore, may utilize multiple transceivers for each sector of the cell.

The base stations 1314a, 1314b may communicate with one or more of the WTRUs 1302a, 1302b, 1302c, 1302d over an air interface 1316, which may be any suitable wireless communication link (e.g., radio frequency (RF), microwave, infrared (IR), ultraviolet (UV), visible light, etc.). The air interface 1316 may be established using any suitable radio access technology (RAT).

More specifically, as noted above, the communications system 1300 may be a multiple access system and may employ one or more channel access schemes, such as CDMA, TDMA, FDMA, OFDMA, SC-FDMA, and the like. For example, the base station 1314a in the RAN 1304 and the WTRUs 1302a, 1302b, 1302c may implement a radio technology such as Universal Mobile Telecommunications System (UMTS) Terrestrial Radio Access (UTRA), which may establish the air interface 1316 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 1314a and the WTRUs 1302a, 1302b, 1302c may implement a radio technology such as Evolved UMTS Terrestrial Radio Access (E-UTRA), which may establish the air interface 1316 using Long Term Evolution (LTE) and/or LTE-Advanced (LTE-A).

In other embodiments, the base station 1314a and the WTRUs 1302a, 1302b, 1302c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and/or the like.

The base station 1314b in FIG. 13A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 1314b and the WTRUs 1302c, 1302d may implement a radio technology such as IEEE 802.11 to establish a wireless local area network (WLAN). In another embodiment, the base station 1314b and the WTRUs 1302c, 1302d may implement a radio technology such as IEEE 802.15 to establish a wireless personal area network (WPAN). In yet another embodiment, the base station 1314b and the WTRUs 1302c, 1302d may utilize a cellular-based RAT (e.g., WCDMA, CDMA2000, GSM, LTE, LTE-A, etc.) to establish a picocell or femtocell. As shown in FIG. 13A, the base station 1314b may have a direct connection to the Internet 1310. Thus, the base station 1314b may not be required to access the Internet 1310 via the core network 1306.

The RAN 1304 may be in communication with the core network 1306, which may be any type of network configured to provide voice, data, applications, and/or voice over internet protocol (VoIP) services to one or more of the WTRUs 1302a, 1302b, 1302c, 1302d. For example, the core network 1306 may provide call control, billing services, mobile location-based services, pre-paid calling, Internet connectivity, video distribution, etc., and/or perform high-level security functions, such as user authentication. Although not shown in FIG. 13A, it will be appreciated that the RAN 1304 and/or the core network 1306 may be in direct or indirect communication with other RANs that employ the same RAT as the RAN 1304 or a different RAT. For example, in addition to being connected to the RAN 1304, which may be utilizing an E-UTRA radio technology, the core network 1306 may also be in communication with another RAN (not shown) employing a GSM radio technology.

The core network 1306 may also serve as a gateway for the WTRUs 1302a, 1302b, 1302c, 1302d to access the PSTN 1308, the Internet 1310, and/or other networks 1312. The PSTN 1308 may include circuit-switched telephone networks that provide plain old telephone service (POTS). The Internet 1310 may include a global system of interconnected computer networks and devices that use common communication protocols, such as the transmission control protocol (TCP), user datagram protocol (UDP) and the internet protocol (IP) in the TCP/IP internet protocol suite. The networks 1312 may include wired or wireless communications networks owned and/or operated by other service providers. For example, the networks 1312 may include another core network connected to one or more RANs, which may employ the same RAT as the RAN 1304 or a different RAT.

Some or all of the WTRUs 1302a, 1302b, 1302c, 1302d in the communications system 1300 may include multi-mode capabilities, i.e., the WTRUs 1302a, 1302b, 1302c, 1302d may include multiple transceivers for communicating with different wireless networks over different wireless links. For example, the WTRU 1302c shown in FIG. 13A may be configured to communicate with the base station 1314a, which may employ a cellular-based radio technology, and with the base station 1314b, which may employ an IEEE 802 radio technology.

Figure 13B:
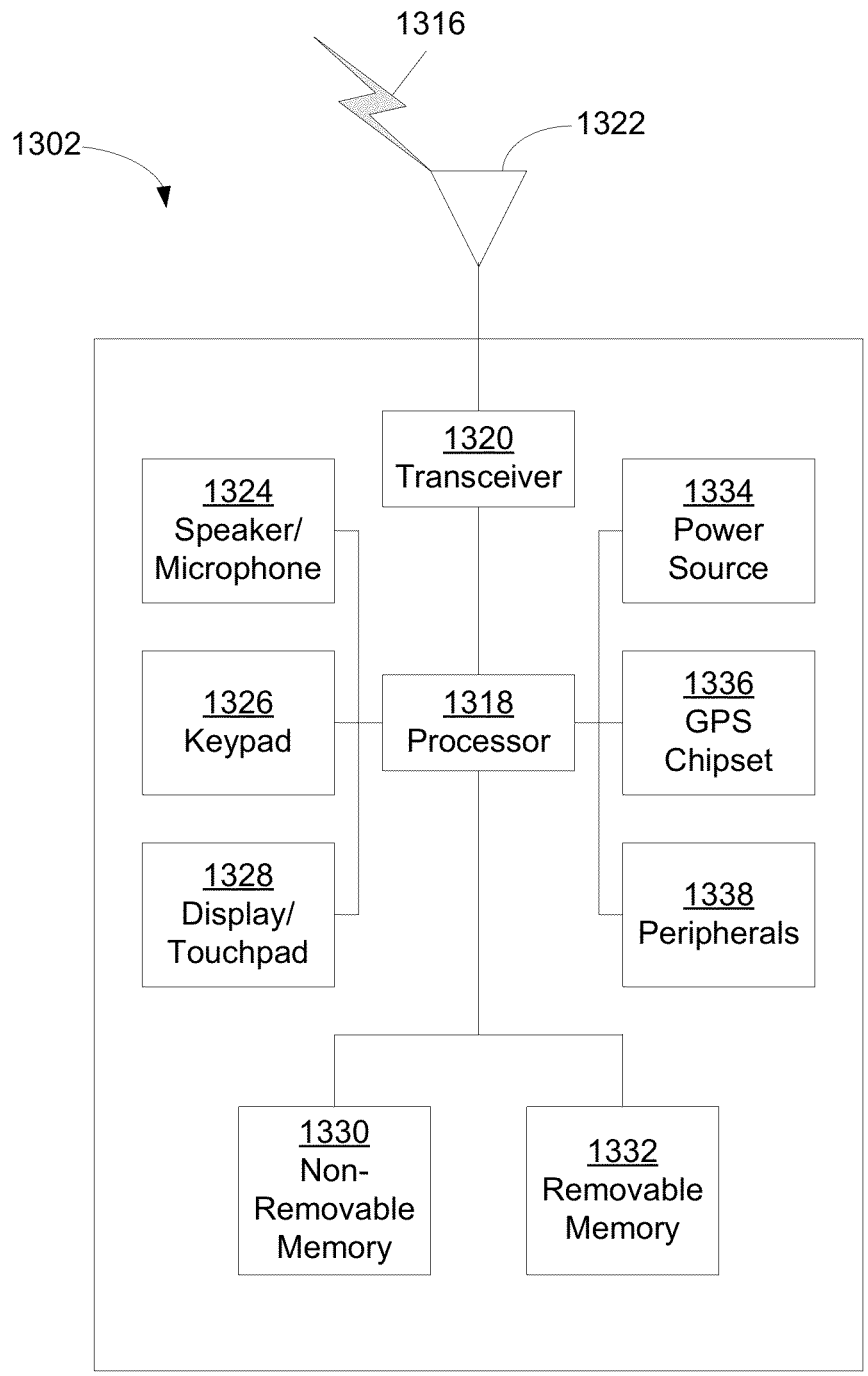
FIG. 13B is a system diagram of an example wireless transmit/receive unit (WTRU) that may be used within the communications system illustrated in FIG. 13A.

FIG. 13B is a system diagram of an example WTRU 1302. As shown in FIG. 13B, the WTRU 1302 may include a processor 1318, a transceiver 1320, a transmit/receive element 1322, a speaker/microphone 1324, a keypad 1326, a display/touchpad 1328, non-removable memory 1330, removable memory 1332, a power source 1334, a global positioning system (GPS) chipset 1336, and other peripherals 1338. It will be appreciated that the WTRU 1302 may include any sub-combination of the foregoing elements while remaining consistent with an embodiment.

The processor 1318 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and/or the like. The processor 1318 may perform signal coding, data processing, power control, input/output processing, and/or any other functionality that enables the WTRU 1302 to operate in a wireless environment. The processor 1318 may be coupled to the transceiver 1320, which may be coupled to the transmit/receive element 1322. While FIG. 13B depicts the processor 1318 and the transceiver 1320 as separate components, it will be appreciated that the processor 1318 and the transceiver 1320 may be integrated together in an electronic package or chip.

The transmit/receive element 1322 may be configured to transmit signals to, or receive signals from, a base station (e.g., the base station 1314a) over the air interface 1316. For example, in an embodiment, the transmit/receive element 1322 may be an antenna configured to transmit and/or receive RF signals. In another embodiment, the transmit/receive element 1322 may be an emitter/detector configured to transmit and/or receive IR, UV, or visible light signals, for example. In yet another embodiment, the transmit/receive element 1322 may be configured to transmit and receive both RF and light signals. It will be appreciated that the transmit/receive element 1322 may be configured to transmit and/or receive any combination of wireless signals.

In addition, although the transmit/receive element 1322 is depicted in FIG. 13B as a single element, the WTRU 1302 may include any number of transmit/receive elements 1322. More specifically, the WTRU 1302 may employ MIMO technology. Thus, in one embodiment, the WTRU 1302 may include two or more transmit/receive elements 1322 (e.g., multiple antennas) for transmitting and receiving wireless signals over the air interface 1316.

The transceiver 1320 may be configured to modulate the signals that are to be transmitted by the transmit/receive element 1322 and to demodulate the signals that are received by the transmit/receive element 1322. As noted above, the WTRU 1302 may have multi-mode capabilities. Thus, the transceiver 1320 may include multiple transceivers for enabling the WTRU 1302 to communicate via multiple RATs, such as UTRA and IEEE 802.11, for example.

The processor 1318 of the WTRU 1302 may be coupled to, and may receive user input data from, the speaker/microphone 1324, the keypad 1326, and/or the display/touchpad 1328 (e.g., a liquid crystal display (LCD) display unit or organic light-emitting diode (OLED) display unit). The processor 1318 may also output user data to the speaker/microphone 1324, the keypad 1326, and/or the display/touchpad 1328. In addition, the processor 1318 may access information from, and store data in, any type of suitable memory, such as the non-removable memory 1330 and/or the removable memory 1332. The non-removable memory 1330 may include random-access memory (RAM), read-only memory (ROM), a hard disk, or any other type of memory storage device. The removable memory 1332 may include a GSM Subscriber Identity Module (SIM) card, a UICC (i.e., UMTS version of the SIM card), a memory stick, a secure digital (SD) memory card, and/or the like. In other embodiments, the processor 1318 may access information from, and store data in, memory that is not physically located on the WTRU 1302, such as on a server or a home computer (not shown).

The processor 1318 may receive power from the power source 1334, and may be configured to distribute and/or control the power to the other components in the WTRU 1302. The power source 1334 may be any suitable device for powering the WTRU 1302. For example, the power source 1334 may include one or more dry cell batteries (e.g., nickel-cadmium (NiCd), nickel-zinc (NiZn), nickel metal hydride (NiMH), lithium-ion (Li-ion), etc.), solar cells, fuel cells, and/or the like.

The processor 1318 may also be coupled to the GPS chipset 1336, which may be configured to provide location information (e.g., longitude and latitude) regarding the current location of the WTRU 1302. In addition to, or in lieu of, the information from the GPS chipset 1336, the WTRU 1302 may receive location information over the air interface 1316 from a base station (e.g., base stations 1314a, 1314b) and/or determine its location based on the timing of the signals being received from two or more nearby base stations. It will be appreciated that the WTRU 1302 may acquire location information by way of any suitable location-determination method while remaining consistent with an embodiment.

The processor 1318 may further be coupled to other peripherals 1338, which may include one or more software and/or hardware modules that provide additional features, functionality and/or wired or wireless connectivity. For example, the peripherals 1338 may include an accelerometer, an e-compass, a satellite transceiver, a digital camera (for photographs or video), a universal serial bus (USB) port, a vibration device, a television transceiver, a hands free headset, a BLUETOOTH® module, a frequency modulated (FM) radio unit, a digital music player, a media player, a video game player module, an Internet browser, and/or the like.

Figure 13C:
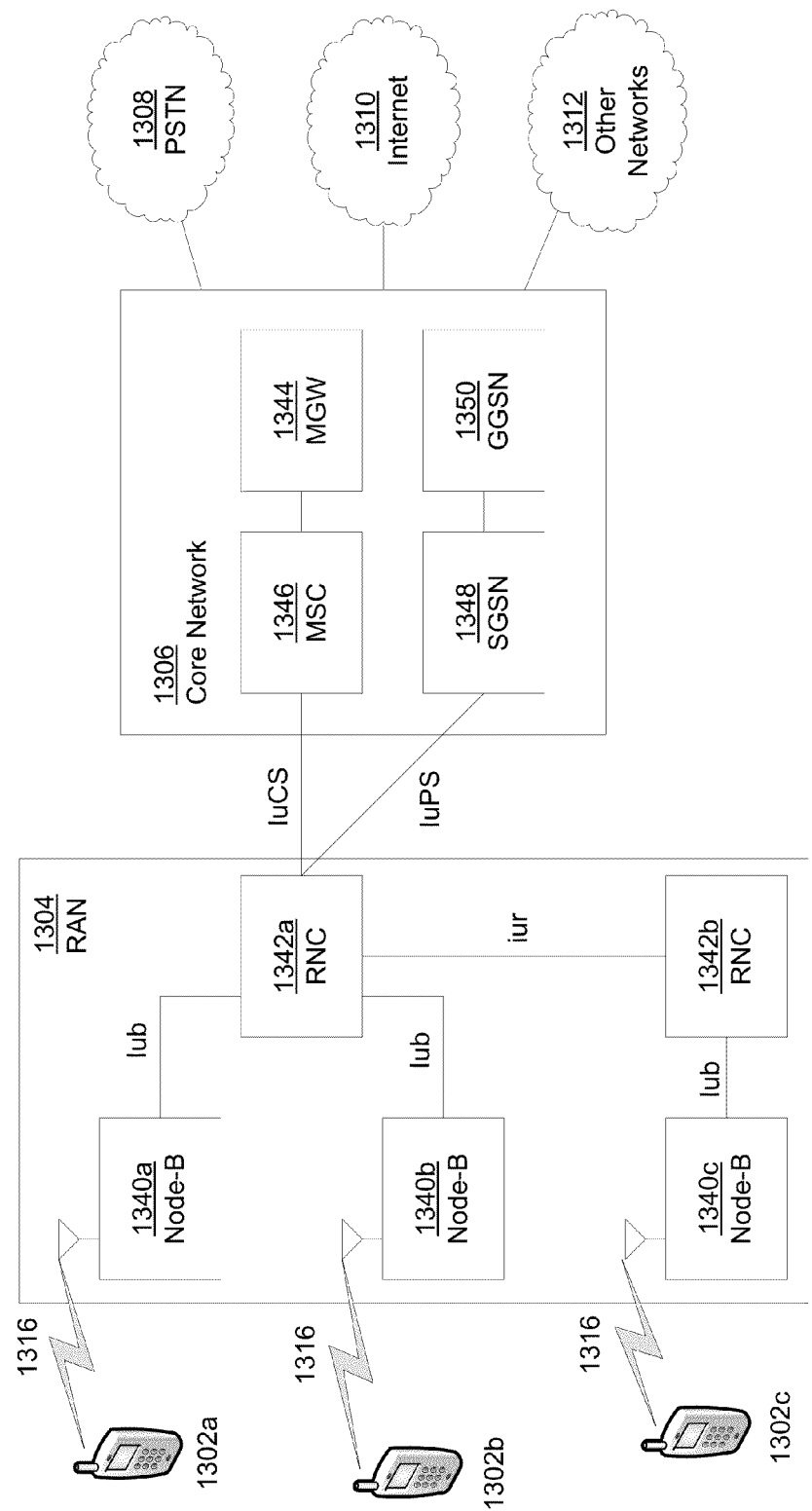
FIG. 13C is a system diagram of an example radio access network (RAN) and an example core network that may be used within the communications system illustrated in FIG. 13A.

FIG. 13C is a system diagram of the RAN 1304 and the core network 1306 according to an embodiment. As noted above, the RAN 1304 may employ a UTRA radio technology to communicate with the WTRUs 1302a, 1302b, 1302c over the air interface 1316. The RAN 1304 may also be in communication with the core network 1306. As shown in FIG. 13C, the RAN 1304 may include Node-Bs 1340a, 1340b, 1340c, which may each include one or more transceivers for communicating with the WTRUs 1302a, 1302b, 1302c over the air interface 1316. The Node-Bs 1340a, 1340b, 1340c may each be associated with a particular cell (not shown) within the RAN 1304. The RAN 1304 may also include RNCs 1342a, 1342b. It will be appreciated that the RAN 1304 may include any number of Node-Bs and RNCs while remaining consistent with an embodiment.

As shown in FIG. 13C, the Node-Bs 1340a, 1340b may be in communication with the RNC 1342a. Additionally, the Node-B 1340c may be in communication with the RNC 1342b. The Node-Bs 1340a, 1340b, 1340c may communicate with the respective RNCs 1342a, 1342b via an Iub interface. The RNCs 1342a, 1342b may be in communication with one another via an Iur interface. Each of the RNCs 1342a, 1342b may be configured to control the respective Node-Bs 1340a, 1340b, 1340c to which it is connected. In addition, each of the RNCs 1342a, 1342b may be configured to carry out or support other functionality, such as outer loop power control, load control, admission control, packet scheduling, handover control, macrodiversity, security functions, data encryption, and/or the like.

The core network 1306 shown in FIG. 13C may include a media gateway (MGW) 1344, a mobile switching center (MSC) 1346, a serving GPRS support node (SGSN) 1348, and/or a gateway GPRS support node (GGSN) 1350. While each of the foregoing elements are depicted as part of the core network 1306, it will be appreciated that any one of these elements may be owned and/or operated by an entity other than the core network operator.

The RNC 1342a in the RAN 1304 may be connected to the MSC 1346 in the core network 1306 via an IuCS interface. The MSC 1346 may be connected to the MGW 1344. The MSC 1346 and the MGW 1344 may provide the WTRUs 1302a, 1302b, 1302c with access to circuit-switched networks, such as the PSTN 1308, to facilitate communications between the WTRUs 1302a, 1302b, 1302c and traditional land-line communications devices.

The RNC 1342a in the RAN 1304 may also be connected to the SGSN 1348 in the core network 1306 via an IuPS interface. The SGSN 1348 may be connected to the GGSN 1350. The SGSN 1348 and the GGSN 1350 may provide the WTRUs 1302a, 1302b, 1302c with access to packet-switched networks, such as the Internet 1310, to facilitate communications between and the WTRUs 1302a, 1302b, 1302c and IP-enabled devices.

As noted above, the core network 1306 may also be connected to the networks 1312, which may include other wired or wireless networks that are owned and/or operated by other service providers.

Figure 13D:
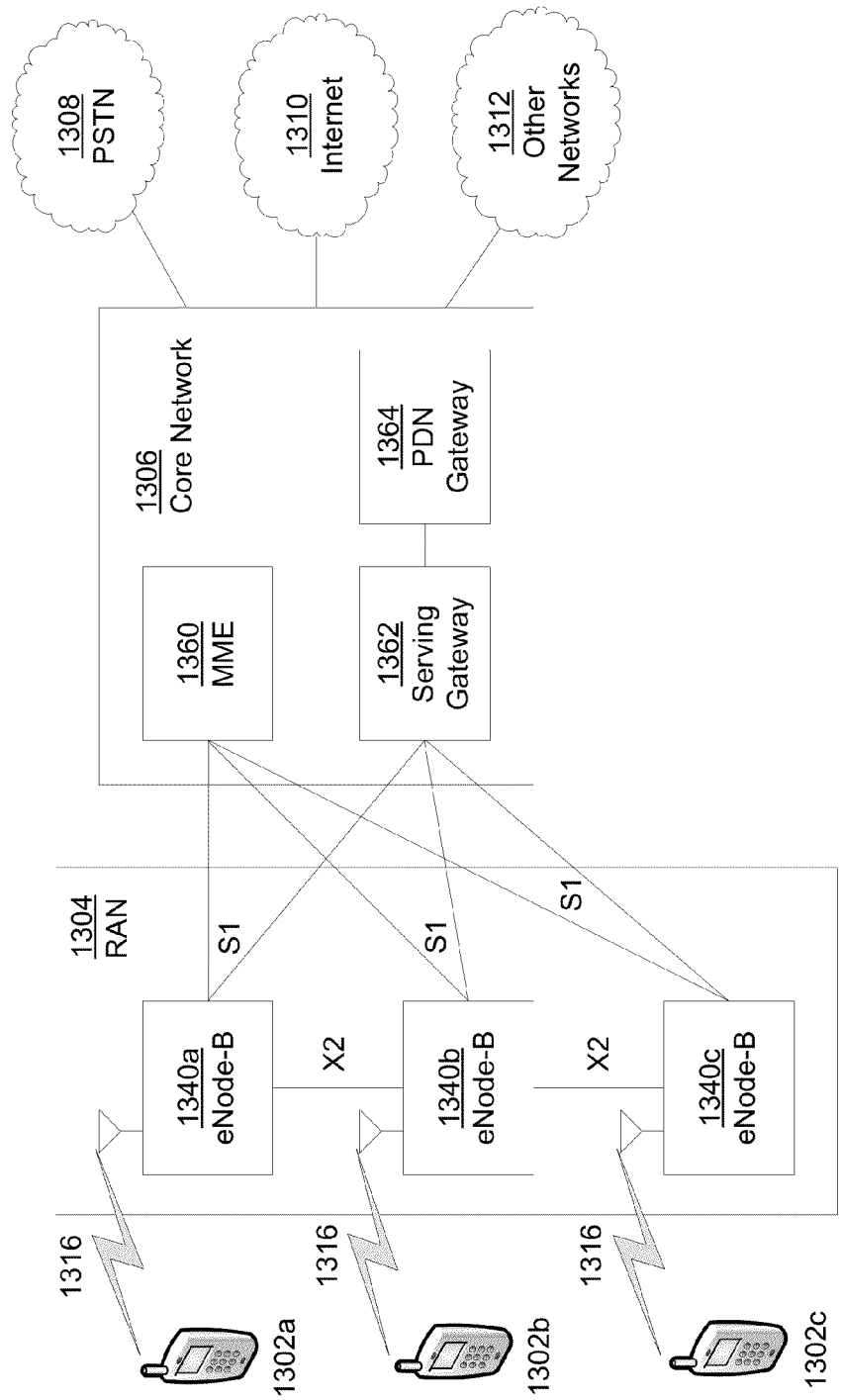
FIG. 13D is another system diagram of an example RAN and core network according to an embodiment.

FIG. 13D is a system diagram of the RAN 1304 and the core network 1306 according to an embodiment. As noted above, the RAN 1304 may employ an E-UTRA radio technology to communicate with the WTRUs 1302a, 1302b, 1302c over the air interface 1316. The RAN 1304 may also be in communication with the core network 1306.

The RAN 1304 may include eNode-Bs 1340a, 1340b, 1340c, though it will be appreciated that the RAN 1304 may include any number of eNode-Bs while remaining consistent with an embodiment. The eNode-Bs 1340a, 1340b, 1340c may each include one or more transceivers for communicating with the WTRUs 1302a, 1302b, 1302c over the air interface 1316. In one embodiment, the eNode-Bs 1340a, 1340b, 1340c may implement MIMO technology. Thus, the eNode-B 1340a, for example, may use multiple antennas to transmit wireless signals to, and receive wireless signals from, the WTRU 1302a.

Each of the eNode-Bs 1340a, 1340b, 1340c may be associated with a particular cell (not shown) and may be configured to handle radio resource management decisions, handover decisions, scheduling of users in the uplink and/or downlink, and the like. As shown in FIG. 13D, the eNode-Bs 1340a, 1340b, 1340c may communicate with one another over an X2 interface.

The core network 1306 shown in FIG. 13D may include a mobility management gateway (MME) 1360, a serving gateway 1362, and/or a packet data network (PDN) gateway 1364. While each of the foregoing elements is depicted as part of the core network 1306, it will be appreciated that any one of these elements may be owned and/or operated by an entity other than the core network operator.

The MME 1360 may be connected to each of the eNode-Bs 1340a, 1340b, 1340c in the RAN 1304 via an S1 interface and may serve as a control node. For example, the MME 1360 may be responsible for authenticating users of the WTRUs 1302a, 1302b, 1302c, bearer activation/deactivation, selecting a particular serving gateway during an initial attach of the WTRUs 1302a, 1302b, 1302c, and the like. The MME 1360 may also provide a control plane function for switching between the RAN 1304 and other RANs (not shown) that employ other radio technologies, such as GSM or WCDMA.

The serving gateway 1362 may be connected to each of the eNode Bs 1340a, 1340b, 1340c in the RAN 1304 via the S1 interface. The serving gateway 1362 may generally route and forward user data packets to/from the WTRUs 1302a, 1302b, 1302c. The serving gateway 1362 may also perform other functions, such as anchoring user planes during inter-eNode B handovers, triggering paging when downlink data is available for the WTRUs 1302a, 1302b, 1302c, managing and storing contexts of the WTRUs 1302a, 1302b, 1302c, and/or the like.

The serving gateway 1362 may also be connected to the PDN gateway 1364, which may provide the WTRUs 1302a, 1302b, 1302c with access to packet-switched networks, such as the Internet 1310, to facilitate communications between the WTRUs 1302a, 1302b, 1302c and IP-enabled devices.

The core network 1306 may facilitate communications with other networks. For example, the core network 1306 may provide the WTRUs 1302a, 1302b, 1302c with access to circuit-switched networks, such as the PSTN 1308, to facilitate communications between the WTRUs 1302a, 1302b, 1302c and traditional land-line communications devices. For example, the core network 1306 may include, or may communicate with, an IP gateway (e.g., an IP multimedia subsystem (IMS) server) that serves as an interface between the core network 1306 and the PSTN 1308. In addition, the core network 1306 may provide the WTRUs 1302a, 1302b, 1302c with access to the networks 1312, which may include other wired or wireless networks that are owned and/or operated by other service providers.

Figure 13E:
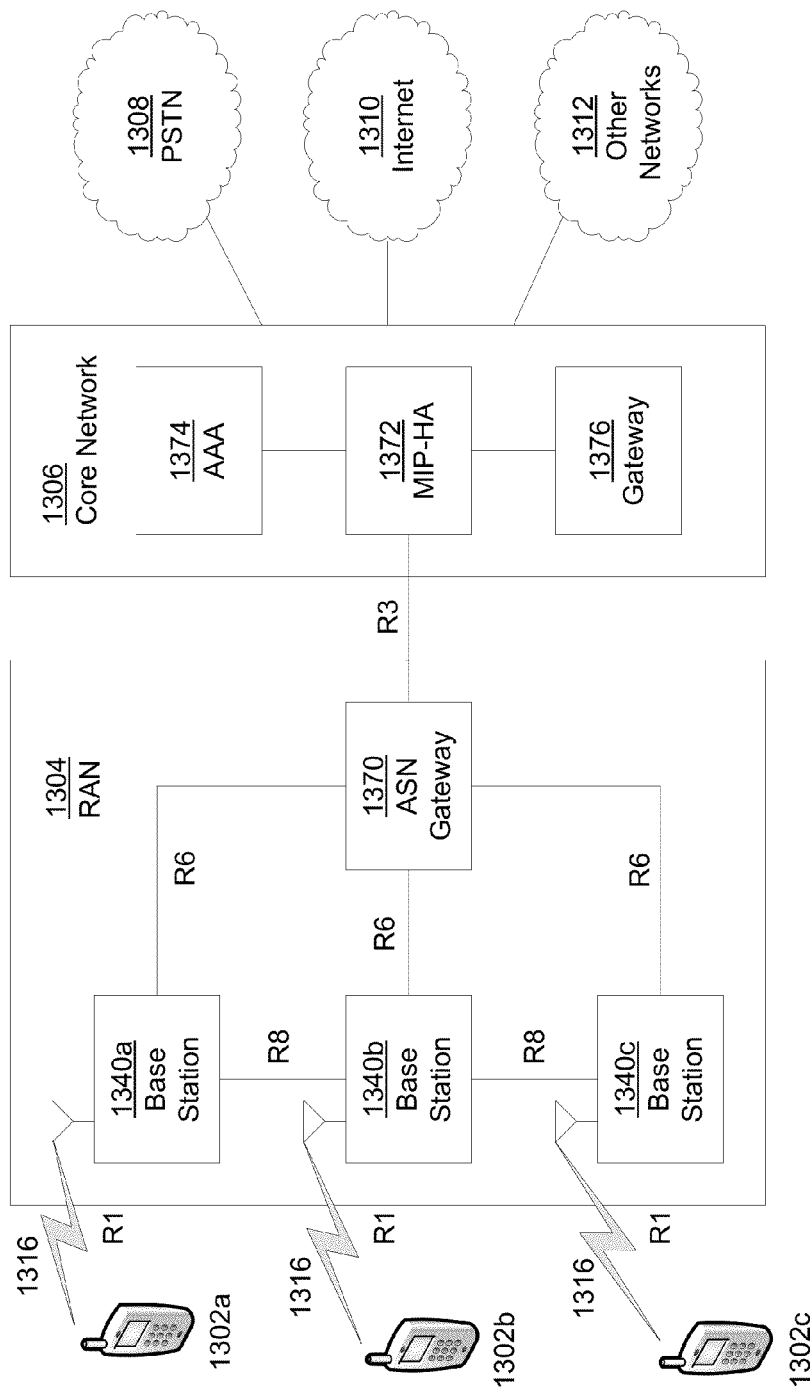
FIG. 13E is another system diagram of an example RAN and core network according to an embodiment.

FIG. 13E is a system diagram of the RAN 1304 and the core network 1306 according to an embodiment. The RAN 1304 may be an access service network (ASN) that employs IEEE 802.16 radio technology to communicate with the WTRUs 1302a, 1302b, 1302c over the air interface 1316. As will be further discussed below, the communication links between the different functional entities of the WTRUs 1302a, 1302b, 1302c, the RAN 1304, and the core network 1306 may be defined as reference points.

As shown in FIG. 13E, the RAN 1304 may include base stations 1340a, 1340b, 1340c, and an ASN gateway 1370, though it will be appreciated that the RAN 1304 may include any number of base stations and ASN gateways while remaining consistent with an embodiment. The base stations 1340a, 1340b, 1340c may each be associated with a particular cell (not shown) in the RAN 1304 and may each include one or more transceivers for communicating with the WTRUs 1302a, 1302b, 1302c over the air interface 1316. In one embodiment, the base stations 1340a, 1340b, 1340c may implement MIMO technology. Thus, the base station 1340a, for example, may use multiple antennas to transmit wireless signals to, and receive wireless signals from, the WTRU 1302a. The base stations 1340a, 1340b, 1340c may also provide mobility management functions, such as handoff triggering, tunnel establishment, radio resource management, traffic classification, quality of service (QoS) policy enforcement, and/or the like. The ASN gateway 1370 may serve as a traffic aggregation point and may be responsible for paging, caching of subscriber profiles, routing to the core network 1306, and the like.

The air interface 1316 between the WTRUs 1302a, 1302b, 1302c and the RAN 1304 may be defined as an R1 reference point that implements the IEEE 802.16 specification. In addition, each of the WTRUs 1302a, 1302b, 1302c may establish a logical interface (not shown) with the core network 1306. The logical interface between the WTRUs 1302a, 1302b, 1302c and the core network 1306 may be defined as an R2 reference point, which may be used for authentication, authorization, IP host configuration management, and/or mobility management.

The communication link between each of the base stations 1340a, 1340b, 1340c may be defined as an R8 reference point that includes protocols for facilitating WTRU handovers and the transfer of data between base stations. The communication link between the base stations 1340a, 1340b, 1340c and the ASN gateway 1370 may be defined as an R6 reference point. The R6 reference point may include protocols for facilitating mobility management based on mobility events associated with each of the WTRUs 1302a, 1302b, 1302c.

As shown in FIG. 13E, the RAN 1304 may be connected to the core network 1306. The communication link between the RAN 1304 and the core network 1306 may defined as an R3 reference point that includes protocols for facilitating data transfer and mobility management capabilities, for example. The core network 1306 may include a mobile IP home agent (MIP-HA) 1372, an authentication, authorization, accounting (AAA) server 1374, and a gateway 1376. While each of the foregoing elements are depicted as part of the core network 1306, it will be appreciated that any one of these elements may be owned and/or operated by an entity other than the core network operator.

The MIP-HA 1372 may be responsible for IP address management, and may enable the WTRUs 1302a, 1302b, 1302c to roam between different ASNs and/or different core networks. The MIP-HA 1372 may provide the WTRUs 1302a, 1302b, 1302c with access to packet-switched networks, such as the Internet 1310, to facilitate communications between the WTRUs 1302a, 1302b, 1302c and IP-enabled devices. The AAA server 1374 may be responsible for user authentication and for supporting user services. The gateway 1376 may facilitate interworking with other networks. For example, the gateway 1376 may provide the WTRUs 1302a, 1302b, 1302c with access to circuit-switched networks, such as the PSTN 1308, to facilitate communications between the WTRUs 1302a, 1302b, 1302c and traditional land-line communications devices. In addition, the gateway 1376 may provide the WTRUs 1302a, 1302b, 1302c with access to the networks 1312, which may include other wired or wireless networks that are owned and/or operated by other service providers.

Although not shown in FIG. 13E, it will be appreciated that the RAN 1304 may be connected to other ASNs and the core network 1306 may be connected to other core networks. The communication link between the RAN 1304 the other ASNs may be defined as an R4 reference point, which may include protocols for coordinating the mobility of the WTRUs 1302a, 1302b, 1302c between the RAN 1304 and the other ASNs. The communication link between the core network 1306 and the other core networks may be defined as an R5 reference, which may include protocols for facilitating interworking between home core networks and visited core networks.

The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Although features and elements are described above in particular combinations, each feature or element may be used alone or in any combination with the other features and elements. For example, the protocol flow steps described herein are not limited to the order in which they are described. In addition, while the embodiments described herein may be described using OpenID authentication, other forms of authentication may be implemented. Similarly, the embodiments described herein may not be limited to OpenID communications or entities. For example, the RP may include any service provider, OP/OPSF may include any identity and/or assertion provider(s), and/or the $OP_{loc}$ may be any local identity and/or assertion provider. Furthermore, any authentication of the UE described herein may include the authentication of the UE and/or the user associated with the UE.

What is claimed:

1. In a system comprising a user equipment (UE), a service provider associated with a cloud-hosted virtual machine, and an identity provider comprising a local identity provider, a method for establishing secure communications between the service provider and the UE, the method comprising:
    establishing, at the UE, a secure channel between the UE and the service provider;
    sending, to the identity provider, authentication parameters for performing an authentication of the UE with the identity provider;
    determining, at the UE, an authentication assertion that indicates a successful authentication of the UE; and
    verifying, at the UE, that the service provider with which the secure channel has been established is an intended service provider for performing authentication for access to services, wherein the service provider is verified using at least one parameter generated during the establishment of the secure channel,
    and wherein establishing the secure channel between the UE and the service provider comprises establishing the secure channel between the local identity provider and the service provider associated with the cloud-hosted virtual machine to enable access to services provided by the cloud-hosted virtual machine.

2. The method of claim 1, further comprising binding the authentication of the UE to the establishment of the secure channel.

3. The method of claim 2, wherein the authentication of the UE comprises a Session Initiation Protocol Digest (SIP-Digest) authentication, and wherein the binding of the authentication of the UE to the establishment of the secure channel comprises binding the SIP-Digest authentication to the establishment of the secure channel.

4. The method of claim 2, wherein the binding of the authentication of the UE to the establishment of the secure channel is performed using information included in the authentication assertion, and wherein the information is associated with the establishment of the secure channel between the UE and the service provider.

5. The method of claim 2, wherein the binding of the authentication of the UE to the establishment of the secure channel enables the UE to verify that the service provider with which the secure channel has been established is the intended service provider.

6. The method of claim 1, further comprising determining an authentication of the service provider at the UE.

7. The method of claim 6, further comprising binding the authentication of the service provider to the establishment of the secure channel between the UE and the service provider.

8. The method of claim 7, wherein the binding of the authentication of the service provider to the establishment of the secure channel enables authentication of the service provider to be determined by the UE being able to verify that the service provider with which the secure channel has been established is the intended service provider.

9. The method of claim 6, wherein the determining the authentication of the service provider comprises receiving a service provider authentication assertion from an external identity provider.

10. The method of claim 1, wherein the determining of the authentication assertion comprises generating the authentication assertion using the local identity provider.

11. The method of claim 1, wherein the local identity provider is associated with a pre-established shared key generated from the authentication of the UE, and wherein the pre-established shared key is used to establish the secure channel between the UE and the service provider.

12. The method of claim 1, wherein the at least one parameter generated during the authentication comprises the authentication assertion, and wherein the at least one parameter generated during establishment of the secure channel comprises an encrypted seed value, a binding response derived from key material extracted from a secure transport-layer security (TLS) tunnel between the UE and the service provider, or a nonce used for establishment of the secure channel.

13. The method of claim 1, wherein the service provider is verified as the intended service provider by validating information received from the service provider via the secure channel between the UE and the service provider.

14. A user equipment (UE) configured to establish secure communications with a service provider associated with a cloud-hosted virtual machine, the UE comprising:
a memory having computer-executable instructions stored thereon; and
a processor configured to execute the computer executable instructions to perform the following:
establish a secure channel between the UE and the service provider;
send authentication parameters to an identity provider comprising a local identity provider residing on the UE, the authentication parameters for performing an authentication of the UE with the identity provider;
determine an authentication assertion that indicates a successful authentication of the UE; and
verify that the service provider with which the secure channel has been established is an intended service provider for performing authentication for services, wherein the service provider is verified using at least one parameter generated during the establishment of the secure channel,
wherein the processor is further configured to establish the secure channel between the UE and the service provider by establishing the secure channel between the local identity provider and the service provider associated with the cloud-hosted virtual machine to enable access to services provided by the cloud-hosted virtual machine.

15. The UE of claim 14, wherein the processor is further configured to bind the authentication of the UE with the establishment of the secure channel.

16. The UE of claim 14, wherein the processor is further configured to:
determine an authentication of the service provider; and
bind the authentication of the service provider to the establishment of the secure channel between the UE and the service provider.

17. The UE of claim 14, wherein the local identity provider is associated with a pre-established shared key generated from the authentication of the UE, and wherein the pre-established shared key is used to establish the secure channel between the UE and the service provider.

18. In a system comprising a user equipment (UE), a network application function (NAF), and a bootstrapping server function (BSF), a method comprising:
establishing, at the UE, a transport-layer security (TLS) tunnel between the UE and the BSF, the TLS tunnel having a TLS master key associated therewith;
in response to a challenge from the BSF, generating, at the UE, a random nonce and calculating an authentication response;
receiving, at the UE, a message that indicates a successful authentication of a user of the UE, the successful authentication resulting in a derivation of a second key; and
deriving, at the UE, a third key for use in subsequently securing communications between the UE and the NAF, the derivation of the third key being at least partially dependent on both the second key and the TLS master key.

19. The method of claim 18, wherein the step of calculating the authentication response is performed using one or more session initiation protocol digest (SIP-digest) credentials.

20. The method of claim 18, wherein the second key is a generic bootstrapping architecture (GBA) session key (Ks), and the step of deriving the third key comprises:
deriving the third key from the Ks using a GBA protocol, wherein the third key is an application specific key (Ks_NAF).

21. The method of claim 20, the method further comprising securing communications between the UE and the NAF using the Ks_NAF.

22. The method of claim 20, wherein the Ks comprises at least one of an integrity key or a confidentiality key.

23. A user equipment (UE) configured to communicate with a network application function (NAF) and a bootstrapping server function (BSF), the UE comprising a memory having computer-executable instructions stored thereon and a processor configured to execute the computer-executable instructions to perform the following:
establish a transport-layer security (TLS) tunnel between the UE and the BSF, the TLS tunnel having a TLS master key associated therewith;
in response to a challenge from the BSF, generate a random nonce and calculate an authentication response;
receive a message that indicates a successful authentication of a user of the UE, the successful authentication resulting in a derivation of a second key; and
derive a third key for use in subsequently securing communications between the UE and the NAF, the derivation of the third key being at least partially dependent on both the second key and the TLS master key.

24. The UE of claim 23, wherein the processor is further configured to execute the computer-executable instructions to calculate the authentication response using one or more session initiation protocol digest (SIP-digest) credentials.

25. The UE of claim 23, wherein the second key is a generic bootstrapping architecture (GBA) session key (Ks), and the processor is further configured to execute the computer-executable instructions to derive the third key from the Ks using a GBA protocol, wherein the third key is an application specific key (Ks_NAF).

26. The UE of claim 25, wherein the processor is further configured to execute the computer-executable instructions to secure communications between the UE and the NAF using the Ks_NAF.

27. The UE of claim 25, wherein the Ks comprises at least one of an integrity key or a confidentiality key.

* * * * *